(12) United States Patent
Westwood

(10) Patent No.: US 9,194,060 B2
(45) Date of Patent: Nov. 24, 2015

(54) POLYOLEFIN-BASED ELASTIC MELTBLOWN FABRICS

(75) Inventor: Alistair Duncan Westwood, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 22 days.

(21) Appl. No.: 13/475,280

(22) Filed: May 18, 2012

(65) Prior Publication Data

US 2012/0225601 A1  Sep. 6, 2012

Related U.S. Application Data

(62) Division of application No. 12/566,564, filed on Sep. 24, 2009.

(60) Provisional application No. 61/101,341, filed on Sep. 30, 2008, provisional application No. 61/157,524, filed on Mar. 4, 2009, provisional application No. 61/156,078, filed on Feb. 27, 2009, provisional application No. 61/171,135, filed on Apr. 21, 2009.

(51) Int. Cl.
*D04H 3/16* (2006.01)
*D01F 6/30* (2006.01)
(Continued)

(52) U.S. Cl.
CPC ... *D01F 6/30* (2013.01); *B32B 5/04* (2013.01); *B32B 5/26* (2013.01); *B32B 27/32* (2013.01);
(Continued)

(58) Field of Classification Search
CPC . D04H 13/005; D04H 13/007; D04H 13/002; B32B 5/04; B32B 27/32; B32B 2305/20; B32B 5/26; B32B 37/144; B32B 2307/51; D01F 6/46; D01F 6/30; Y10T 442/601; Y10T 442/602

USPC ............. 442/328, 329, 382, 400; 156/182
See application file for complete search history.

(56) References Cited

U.S. PATENT DOCUMENTS 3,338,992 A   8/1967   Kinney
3,341,394 A   9/1967   Kinney
(Continued)

FOREIGN PATENT DOCUMENTS

JP   2005/171456   6/2005
JP       4753852   8/2007
(Continued)

OTHER PUBLICATIONS

Watzl, Alfred, "Spunlace Meets Spunbonding," Nonwoven/Technical Textiles, Feb. 2005, available at http://www.textileworld.com/Issues/2005/February/Nonwovens-Technical_Textiles/Spunlace_Meets_Spunbonding.*

(Continued)

*Primary Examiner* — Jeremy R Pierce
(74) *Attorney, Agent, or Firm* — Kevin M. Faulkner

(57) ABSTRACT

Disclosed herein is a process for forming a multilayer construction, and the multilayer constructions including at least one layer of an elastic meltblown fabric, the process comprising extruding one or more polyolefin polymer (e.g., a propylene-α-olefin copolymer) having a MFR from less than 90 dg/min through at least one die having a plurality of nozzles to form a plurality of continuous fibers, at least one die operating at a melt pressure from greater than 500 psi (3.45 MPa) to form at least one elastic meltblown fabric, and adhering the at least one elastic meltblown fabric to at least one extensible fabric.

13 Claims, 8 Drawing Sheets

(51) Int. Cl.
*B32B 5/04* (2006.01)
*B32B 5/26* (2006.01)
*B32B 27/32* (2006.01)
*B32B 37/14* (2006.01)
*D01F 6/46* (2006.01)
*D04H 13/00* (2006.01)

(52) U.S. Cl.
CPC ............... *B32B 37/144* (2013.01); *D01F 6/46* (2013.01); *D04H 13/002* (2013.01); *D04H 13/005* (2013.01); *D04H 13/007* (2013.01); *B32B 2305/20* (2013.01); *B32B 2307/51* (2013.01); *Y10T 442/601* (2013.01); *Y10T 442/602* (2013.01)

(56) References Cited

U.S. PATENT DOCUMENTS

| | | | |
|---|---|---|---|
| 3,502,763 | A | 3/1970 | Hartmann |
| 3,542,615 | A | 11/1970 | Dobo et al. |
| 3,692,618 | A | 9/1972 | Dorschner et al. |
| 3,802,817 | A | 4/1974 | Matsuki et al. |
| 3,849,241 | A | 11/1974 | Butin et al. |
| 4,340,563 | A | 7/1982 | Appel et al. |
| 4,461,872 | A | 7/1984 | Su |
| 4,540,753 | A | 9/1985 | Cozewith et al. |
| 5,057,475 | A | 10/1991 | Canich et al. |
| 6,268,203 | B1 | 7/2001 | Johnson et al. |
| 6,444,761 | B1 * | 9/2002 | Wang et al. ............ 525/404 |
| 6,482,896 | B2 | 11/2002 | Maugans et al. |
| 6,525,157 | B2 | 2/2003 | Cozewith et al. |
| 6,936,554 | B1 * | 8/2005 | Singer et al. ........... 442/327 |
| 7,601,666 | B2 | 10/2009 | Rix et al. |
| 2001/0044610 | A1 * | 11/2001 | Kim et al. ............ 604/365 |
| 2001/0053837 | A1 * | 12/2001 | Agarwal et al. ........ 526/335 |
| 2002/0019507 | A1 | 2/2002 | Karandinos et al. |
| 2002/0099347 | A1 * | 7/2002 | Chen et al. ............ 604/369 |
| 2003/0194939 | A1 | 10/2003 | Schwarz |
| 2005/0027080 | A1 | 2/2005 | Bodiford et al. |
| 2005/0130544 | A1 * | 6/2005 | Cheng et al. .......... 442/415 |
| 2005/0215964 | A1 * | 9/2005 | Autran et al. .......... 604/358 |
| 2006/0173123 | A1 | 8/2006 | Yang et al. |
| 2010/0081352 | A1 | 4/2010 | Westwood |
| 2010/0124864 | A1 | 5/2010 | Dharmarajan et al. |
| 2010/0222755 | A1 | 9/2010 | Westwood |
| 2010/0222761 | A1 | 9/2010 | Westwood et al. |
| 2010/0266818 | A1 | 10/2010 | Westwood et al. |
| 2010/0267914 | A1 | 10/2010 | Westwood et al. |

FOREIGN PATENT DOCUMENTS

| | | | |
|---|---|---|---|
| WO | WO 98/39384 | 9/1998 | |
| WO | WO 2004/038078 | 5/2004 | |
| WO | WO 2007024447 A1 * | 3/2007 | ............... D04H 1/42 |
| WO | WO 2009/064583 | 5/2009 | |
| WO | WO 2010/039583 | 4/2010 | |

OTHER PUBLICATIONS

Rupp, Jurg, "Spunlaced or Hydroentangled Nonwovens," Nonwovens/Technical Textiles, Jul./Aug. 2008, available at http://www.textileworld.com/Issues/2008/July-August/Nonwovens-Technical_Textiles/Spunlaced_Or_Hydroentangled_Nonwovens.*

Dharmarajan, N. et al., "*Tailoring the Performance of Specialty Polyolefin Elastomer Based Elastic Nonwoven Fabrics*", INTC® 2006, International Nonwovens Technical Conference, Conference Proceedings, Houston, TX, United States, Sep. 25-28, 2006.

Dutta, S. et al., "*More Efficient Manufacture of Controlled-rheology Polypropylene*", Society of Plastics Engineers, Plastics Research Online (2010).

Harrington, B.A. et al.,"*Processability and Fabric Attributes of Specialty Polyolefin* Elastomers", TNTC 2005, International Nonwovens Technical Conference, Conference Proceedings, St. Louis, MS, United States, Sep. 19-22, 2005.

Kacker, S. et al., "*Properties of Elastic Nonwoven Fabrics Based Upon Specialty Polyolefin Elastomers*", INTC® 2006, International Nonwovens Technical Conference, Conference Proceedings, Houston, TX, United States, Sep. 25-28, 2006.

Srivatsan, S. et al., "*Novel Polyolefin Resin for Elastic Spunbond & Melt Blown Applications*", INTC® 2004, Toronto, Canada, Sep. 20-23, 2004.

Wheeler, L.M. et al., "*Gel Permeation Chromatography/Fourier Transform Infrared Interface for Polymer Analysis*", Applied Spectroscopy, vol. 47, No. 8, pp. 1128-1130 (1993).

* cited by examiner

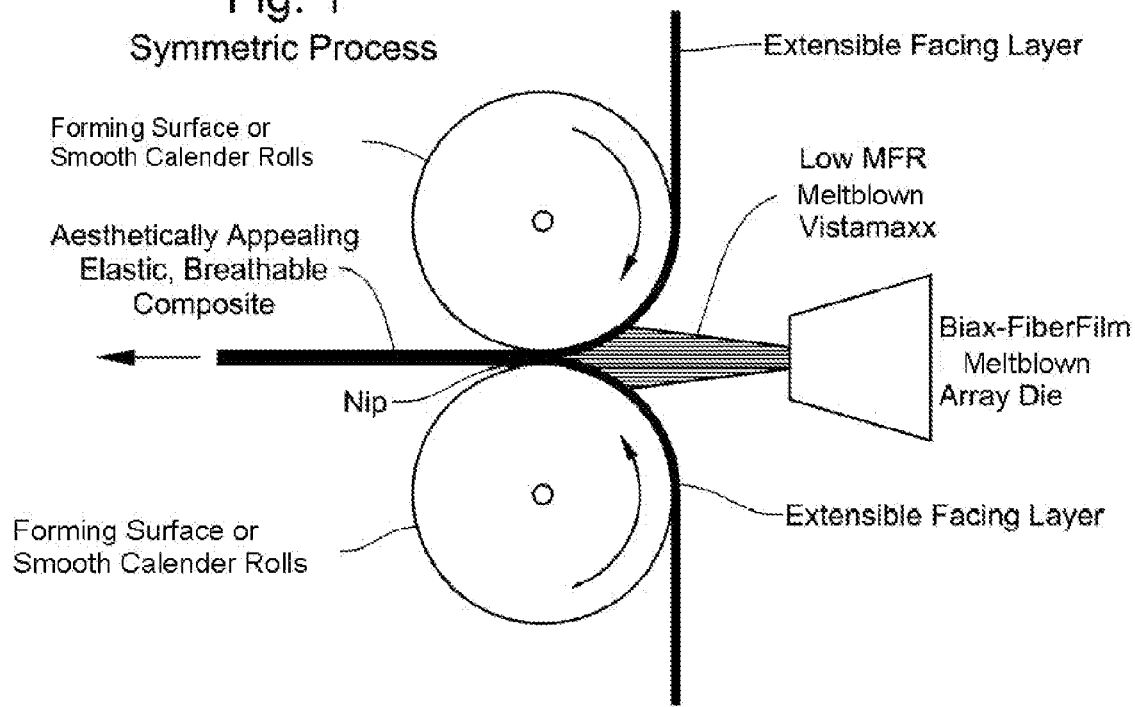
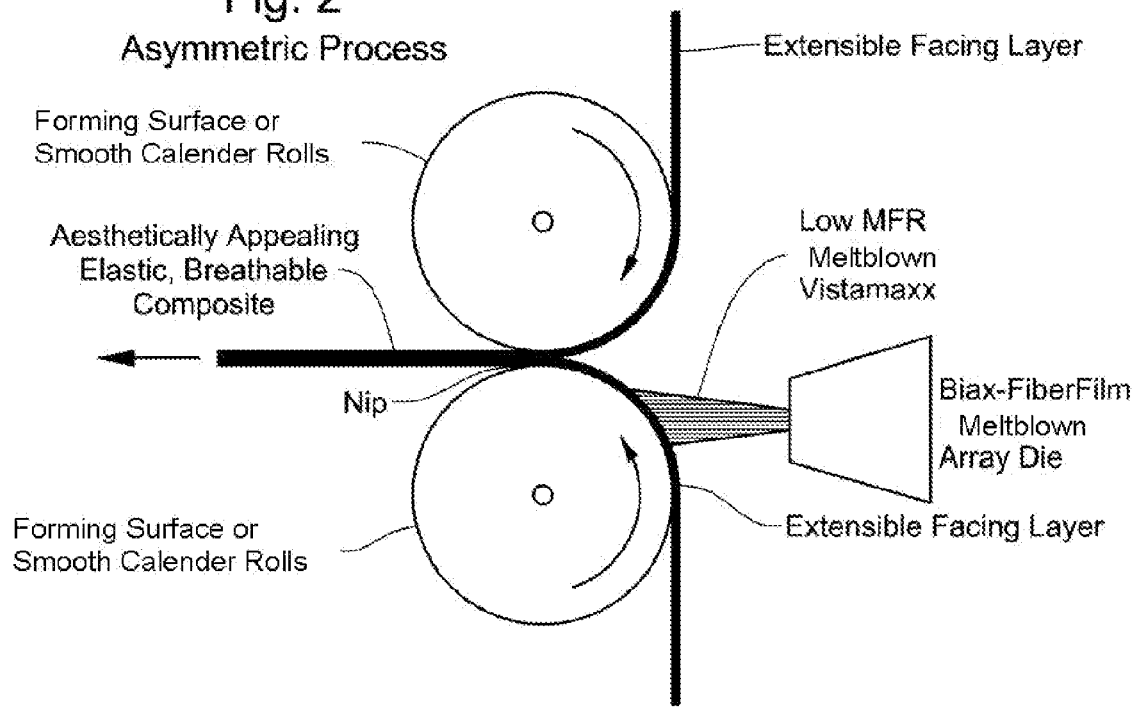

50% Retractive Force
0.15 lbf / 68gf

50% Retractive Force
0.38 lbf / 168gf

50% Retractive Force
0.44 lbf / 200 gf

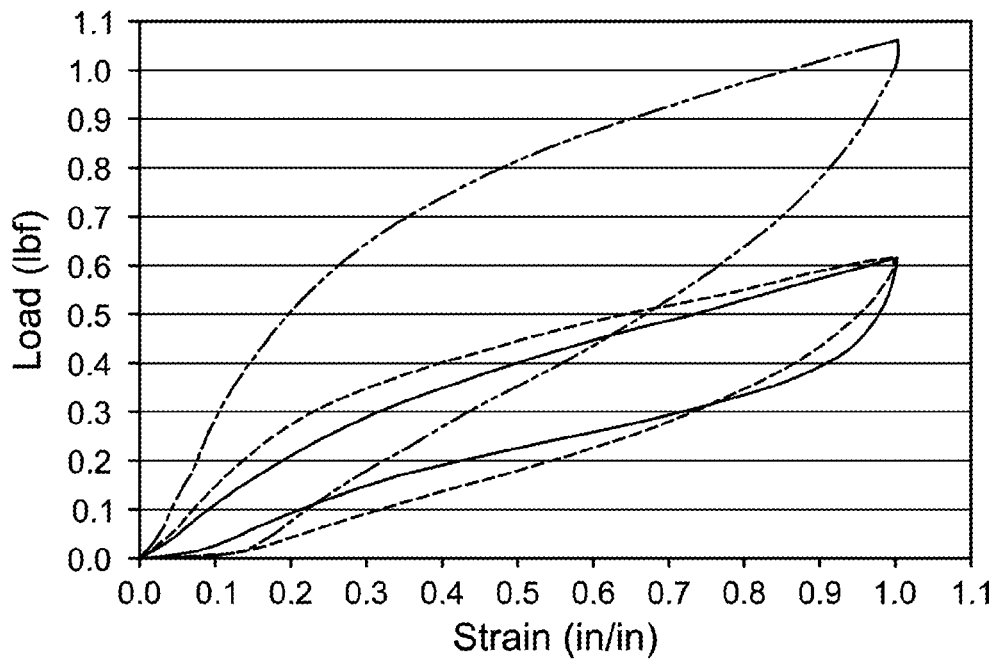
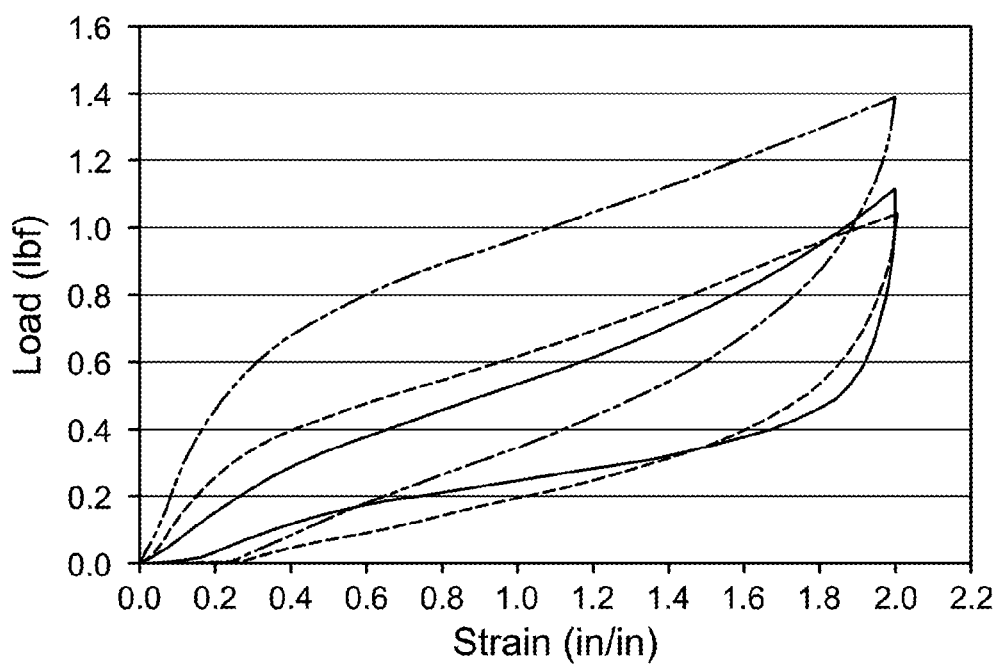

Basis Wt. 140-150 gsm

Basis Wt. 125-130 gsm

Tension Set @ 100°F

Sample 1.10-2

Retractive Force @ 50% =0

Retractive Force @ 50% 0.11 lbf / 50 gf

Retractive Force @ 50% 0.08 lbf / 36 gf y=-0.1426Ln(x) + 1.7365

$R^2$= 0.9123 y=-0.132Ln(x) + 1.6666

$R^2$= 0.9253 y=-0.0278Ln(x) + 0.5709

$R^2$= 0.4127

POLYOLEFIN-BASED ELASTIC MELTBLOWN FABRICS

CROSS REFERENCE TO RELATED APPLICATIONS

This application is a divisional application of and claims priority to U.S. patent application Ser. No. 12/566,564, filed Sep. 24, 2009, which claims priority from U.S. Ser. No. 12/271,526, filed Nov. 14, 2008, and claims the benefit of and priority from U.S. Ser. No. 61/101,341, filed Sep. 30, 2008, and U.S. Ser. No. 61/157,524, filed Mar. 4, 2009, and U.S. Ser. No. 61/156,078, filed Feb. 27, 2009, and U.S. Ser. No. 61/171,135, filed Apr. 21, 2009, all of which are incorporated by reference in their entirety. This application is related to international patent application nos. PCT/US2009/058230, PCT/US2009/058245, and PCT/US2009/058250, concurrently filed on Sep. 24, 2009, which are all incorporated by reference in their entirety.

FIELD OF THE INVENTION

This disclosure relates to elastic meltblown fabrics (formed from elastic meltblown fibers) containing polyolefin polymer, and multilayer constructions made therefrom, and to methods of forming the elastic meltblown fibers/fabrics and multilayer constructions.

BACKGROUND

The market desires a highly elastic, breathable, nonwoven fabric with the necessary aesthetic qualities that requires no form of mechanical activation. Existing products are complex laminates comprised of an elastic film: typically a styrenic block copolymer ("SBC") or polyurethane as the elastic film that has polyolefin skins coextruded onto the film to prevent blocking, and nonwovens in order to provide the correct aesthetic (a soft, fluffy, cushion-like texture) and in certain constructions a hot melt glue layer to bond the nonwoven to either side of the elastic film. These types of constructions, once formed, are often not elastic due to the constraining influence of the inelastic components such as the polyolefin skin layers and nonwoven facing layers.

In order to remove the constraining influence of non-elastic elements, many composites require a mechanical stretching or activation process in order to stretch or break the non-elastic components. The mechanical stretching removes the constraints and creates an elastic composite controlled by the SBC film. Furthermore, such composites require the film to be apertured in order to make these laminates breathable. This process involves the controlled puncturing/tearing of the film with the associated concerns for film failure and increased scrap rates.

Recently, film composites have arrived on the market that do not require mechanical activation. These products still comprise a SBC film layer with a highly extensible spunlaced layer attached to either side of the film using thin lines of hot melt glue. The regions between the glued areas are not constrained and therefore elastic because the film does not have a coextruded skin and the nonwoven is extensible and non-restraining. However, these products are not breathable, require adhesives, and like all of the film laminate products are costly to produce.

SUMMARY

Provided are nonwoven fabrics having one or more layers wherein at least one layer is composed of propylene-ethylene copolymer. An exemplary propylene-ethylene copolymer resin is commercially available as Vistamaxx resins from ExxonMobil Chemical Company, Houston, Tex. The nonwoven fabrics described herein may be prepared using any manufacturing process, such as in situ lamination, co-extrusion, meltblown techniques, etc. The nonwoven fabrics are preferably highly extensible, e.g., >300% Ultimate Elongation with a low tensile force.

In one embodiment, a multilayer article is composed of at least one extensible nonwoven fabric and at least one highly elastic meltblown fabric. Preferably, the multilayer article does not include a conventional adhesive, which binds the layers of the article.

Disclosed herein in one embodiment is a multilayer construction comprising at least one layer of elastic meltblown fabric comprising one or more polyolefin polymer(s) having a MFR ("MFR," ASTM D1238, 2.16 kg, 230° C.) from less than 90 dg/min, the elastic meltblown fabric having an Ultimate Elongation (ASTM D 412, "Ultimate Elongation" is the elongation at which rupture occurs in the application of continued tensile stress) from greater than 500%, and at least one extensible fabric layer.

Disclosed herein in another embodiment is a multilayer construction comprising at least one layer of elastic meltblown fabric comprising one or more polyolefin polymer(s) having a MFR from less than 90 dg/min, and $H_f$ value is from less than 75 J/g (or a crystallinity of less than 40%), and at least one extensible fabric layer.

Disclosed herein in yet another embodiment is a process for forming a multilayer construction comprising extruding one or more polyolefin polymer(s) having a MFR from less than 90 dg/min through at least one die having a plurality of nozzles to form a plurality of continuous fibers, at least one die operating at a melt pressure from greater than 500 psi (3.45 MPa) to form at least one elastic meltblown fabric, and adhering the at least one elastic meltblown fabric to at least one extensible fabric.

The various descriptive elements and numerical ranges disclosed herein can be combined with other descriptive elements and numerical ranges to describe preferred embodiments of the invention(s); further, any upper numerical limit of an element can be combined with any lower numerical limit of the same element to describe preferred embodiments.

BRIEF DESCRIPTION OF THE DRAWINGS

FIGS. 1-9 are appended hereto. FIGS. 3-9 do not bear Figure numbers, but are numbered sequentially from 3 to 9.

FIG. 1 is a representation of one embodiment of the formation of the multilayer constructions described herein, showing a side-view of an array die and collector drums, a polyolefin polymer being meltblown on fabrics being transported on the surface of the collector drums in a symmetrical orientation with respect to the array die.

FIG. 2 is a representation of one embodiment of the formation of the multilayer constructions described herein, showing a side-view of an array die and collector drums, a polyolefin polymer being meltblown on fabrics being transported on the surface of the collector drums in an asymmetrical orientation with respect to the array die.

FIGS. 4A, 4B, and 4C are load (lb) vs strain (in/in) plots of stretch performance of exemplary multilayer constructs and conventional diaper ear products.

FIG. 5 is a load (lb) vs strain (in/in) plot of stretch performance of exemplary multilayer constructs and a conventional adult incontinence (AI) product.

FIG. 7 is a load (lb) vs strain (in/in) plot of tension set performance at 100° F. of exemplary multilayer constructs.

DETAILED DESCRIPTION

Figure 3A:
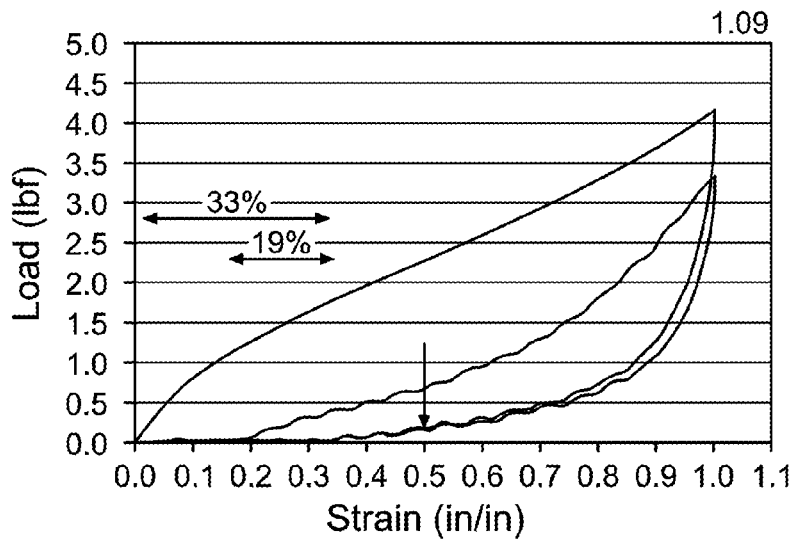
FIGS. 3A, 3B, and 3C are load (lb) vs strain (in/in) plots of the retractive force performance of exemplary multilayer constructs at room temperature.

Described herein are multilayer constructions of layered fabrics (optionally including films), and methods of forming such, comprising at least one layer of elastic meltblown fabric and at least one extensible fabric layer. The polymers that form the meltblown fibers and fabrics have a relatively high molecular weight, as reflected by the range of relatively low MFR of the polyolefin polymers used. This will achieve a desired elasticity (high Ultimate Elongation for the fabric) and performance comparable to elastic fabrics and films produced from other materials. To achieve this end, the elastic meltblown fabrics are meltblown from equipment that can operate at a relatively high melt pressure (greater than 500 psi (3.45 MPa)) and create fibers as fine as 5 μm in average diameter.

As used herein, a "fabric" is a structure, preferably flat but bendable and otherwise formable, having a thickness such that it impedes, but does not stop, the passage of air, the fabric made from fibers that are bound together through chemical bonding, melt adhesion or weaving (mechanical linkage) such that they form the fabric. As used herein, a "fiber" is a material whose length is very much greater than its diameter or breadth: the average diameter is on the order of 5 to 250 μm, and comprises natural and/or synthetic substances.

"Extensible fabrics" are known in the art and are formed, in one instance, from a material that is extensible (e.g., polyurethanes, styrenic block copolymers, EVAs, polypropylene homopolymers and copolymers, polyethylenes, and blends thereof) such as described in U.S. Pat. No. 6,506,698, U.S. Pat. No. 5,921,973 and U.S. Pat. No. 5,804,286, or by mechanically distorting or twisting a fabric (natural or synthetic) such as described in U.S. Pat. No. 5,523,141. In forming extensible fabrics by mechanical distortion, the fabric typically comprises a multiplicity of continuous fibers extending in generally parallel paths in different directions, where the fabric starts as being essentially non-extensible in the directions of the paths. The mechanical distortion can be accomplished in an apparatus capable of mechanically distorting the paths of the continuous fibers in some or all of the directions, whereby the paths of the fibers are distorted into aligned, locally parallel, curved paths extending in the same general direction to impart extensibility to the fabric in each of the directions.

As used herein, "elastic meltblown fibers" and "elastic meltblown fabrics" are fibers and fabrics derived from a meltblowing process as generally described herein and known in the art, where the meltblown fibers/fabric comprise one or more polyolefin polymers(s), in a particular embodiment propylene-α-olefin copolymer(s), the fabric possessing an Ultimate Elongation of greater than 200%, or greater than about 300%, or greater than about 400%, or greater than about 500%, or greater than about 600%. The "polyolefin polymer(s)" and "propylene-α-olefin copolymer(s)" may be described alternatively by combinations of elements described herein.

As used herein, a "construction" or "multilayered construction" is a material that comprises two or more fabrics (and optionally additionally one or more films) layered and bound together to form a unitary laminate or composite. By "bound," "bond" or "adhered," what is meant is that two or more fabrics, or a plurality of fibers, is secured to one another through i) the inherent tendency of the molten or non-molten materials' ability to adhere through chemical interactions and/or ii) the ability of the molten or non-molten fibers or fabric to entangle with the fibers comprising another material to generate a linkage between the fibers or fabrics.

The elastic meltblown fibers and fabric comprise one or more polyolefin polymers, in a particular embodiment a propylene-α-olefin copolymer(s). Such compositions can also include additives. In certain embodiments, the elastic meltblown fibers and fabric consist essentially of one or more polyolefin polymers, in a particular embodiment propylene-α-olefin copolymer(s). By "consist essentially of," what is meant is that the fibers or fabric may include "additives" to no more than 4 wt % by weight of the fiber or fabric, or alternatively, as long as the elasticity of the fabrics made therefrom maintain the desired elasticity (Ultimate Elongation from greater than 500%). In other embodiments, the elastic meltblown fibers and fabrics comprise within the range from 50 or 60 or 70 to 80 or 85 or 90 or 99 wt %, by weight of the fiber or fabric, of one or more polyolefin polymer(s), the remainder being selected from the group consisting of propylene homopolymers (100 wt % propylene-derived units), propylene copolymers, polypropylene impact copolymers, linear low density polyethylene, high density polyethylene, low density polyethylene, ethylene block copolymers (e.g., Infuse™ olefin block copolymers), oils (e.g., Sundex™, Elevast™, Kaydol™, Paralux™, etc.) and combinations thereof. In yet other embodiments, the elastic meltblown fibers and fabrics comprise within the range from 50 or 60 or 70 to 80 or 85 or 90 or 99 wt %, by weight of the fiber or fabric, of one or more polyolefin polymer(s), the remainder being selected from the group consisting of styrenic block copolymers (e.g., Kraton™ styrenic copolymers), ethylene vinylacetates, urethanes, polyesters, propylene homopolymers, propylene copolymers, polypropylene impact copolymers, linear low density polyethylene, high density polyethylene, low density polyethylene, ethylene block copolymers, oils and combinations thereof. By "propylene copolymer," what is meant is a propylene-based polymer comprising from 0.01 to 5 wt %, by weight of the polymer, of a comonomer derived unit selected from ethylene and $C_4$ to $C_{12}$ α-olefins. The term "oils" includes paraffinic, naphthenic, silicon, mineral and polyolefin materials that have a $Kv^{100}$ within the range from 10 to 3000 cSt (ASTM D445 100° C.).

As used herein, "additives" include, for example, stabilizers, surfactants, antioxidants, fillers, colorants, nucleating agents, anti-block agents, UV-blockers/absorbers, UV-initiators (other free radical generators), coagents (cross-linkers and cross-link enhancers), hydrocarbon resins (e.g., Oppera™ resins), and slip additives. Primary and secondary antioxidants include, for example, hindered phenols, hindered amines, and phosphates. Nucleating agents include, for example, sodium benzoate and talc, and highly crystalline propylene polymers. Slip agents include, for example, oleamide and erucamide. Examples of fillers include carbon black, clay, talc, calcium carbonate, mica, silica, silicate, and combinations thereof. Other additives include dispersing agents and catalyst deactivators such as calcium stearate, hydrotalcite, and calcium oxide, and/or other acid neutralizers known in the art.

Polyolefin Polymer

The "polyolefin polymers" described herein are homopolymers or copolymers of α-olefins having less than 40% crystallinity, or a heat of fusion ($H_f$) of less than 75 J/g. The MFR of the polyolefin polymer is less than 90 dg/min in certain embodiments. The polyolefin polymers may be variously described by parameters as used to describe the propylene-α-olefin copolymers, which is a particular embodiment of the useful polyolefin polymers. Preferably, the polyolefin polymers are propylene-based or ethylene-based homopolymers or copolymers comprising none (for homopolymers) or from 0.1 or 1 or 2 or 5 to 10 or 15 or 20 or 45 wt %, by weight of the polymer, of comonomer-derived units selected from ethylene and $C_4$-$C_{10}$ α-olefins (propylene-based polymers) and $C_3$-$C_{10}$ α-olefins (ethylene-based polymers). Examples of polyolefin polymers include propylene homopolymers, ethylene homopolymers, propylene copolymers and ethylene copolymers (e.g., LLDPE, HDPE, LDPE), each having a crystallinity of less than 40% as described herein.

In a particular embodiment, the polyolefin polymer is a propylene-α-olefin copolymer. The "propylene-α-olefin copolymers" described herein are copolymers of propylene-derived units and one or more units derived from ethylene or a $C_4$-$C_{10}$ α-olefin and optionally one or more diene-derived units, and are relatively elastic and/or form nonwoven fibers and fabrics that are elastic (Ultimate Elongation from greater than 500%). The overall comonomer content of the copolymer is within the range from 5 to 35 wt % in one embodiment. In some embodiments, where more than one comonomer is present, the amount of a particular comonomer may be less than 5 wt %, but the combined comonomer content is from greater than 5 wt %. The propylene-α-olefin copolymers may be described by any number of different parameters, and those parameters may comprise a numerical range made up of any desirable upper limit with any desirable lower limit as described herein for the propylene-α-olefin copolymers.

The propylene-α-olefin copolymer may be either a random copolymer (the comonomer-derived units are randomly distributed along the polymer backbone) or a block copolymer (the comonomer-derived units occur along long sequences), or any variation thereof (having some properties of each). The presence of randomness or "blocky-ness" in a copolymer can be determined by $^{13}$C NMR as is known in the art and described in, for example, 18 J. POLY. SCI: POLY. LETT. ED. 389-394 (1980).

In certain embodiments, the propylene-α-olefin copolymer comprises ethylene or $C_4$-$C_{10}$ α-olefin-derived units (or "comonomer-derived units") within the range from 5 or 7 or 8 or 10 to 18 or 20 or 25 or 32 or 35 wt % by weight of the copolymer. The propylene-α-olefin copolymer may also comprise two different comonomer-derived units. Also, these copolymers and terpolymers may comprise diene-derived units as described below. In a particular embodiment, the propylene-α-olefin copolymer comprises propylene-derived units and comonomer units selected from ethylene, 1-hexene and 1-octene. And in a more particular embodiment, the comonomer is ethylene, and thus the propylene-α-olefin copolymer is a propylene-ethylene copolymer.

In one embodiment, the propylene-α-olefin copolymer comprises from less than 10 or 8 or 5 or 3 wt %, by weight of the copolymer or terpolymer, of diene derived units (or "diene"), and within the range from 0.1 or 0.5 or 1 to 5 or 8 or 10 wt % in yet another embodiment. Suitable dienes include for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene, if present, is most preferably ENB.

In certain embodiments, the propylene-α-olefin copolymers have a triad tacticity of three propylene units, as measured by $^{13}$C NMR, from greater than 75% or 80% or 82% or 85% or 90%. In one embodiment, the triad tacticity is within the range from 50 to 99%, and from 60 to 99% in another embodiment, and from 75 to 99% in yet another embodiment, and from 80 to 99% in yet another embodiment; and from 60 to 97% in yet another embodiment. Triad tacticity is determined as follows: The tacticity index, expressed herein as "m/r", is determined by $^{13}$C nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios from greater than 50. Embodiments of the propylene-α-olefin copolymer have a tacticity index m/r within the range from 4 or 6 to 8 or 10 or 12.

In certain embodiments, the propylene-α-olefin copolymers have a heat of fusion ($H_f$), determined according to the Differential Scanning calorimetry (DSC) procedure described herein, within the range from 0.5 or 1 or 5 J/g, to 35 or 40 or 50 or 65 or 75 J/g. In certain embodiments, the $H_f$ value is from less than 75 or 65 or 55 J/g.

In certain embodiments, the propylene-α-olefin copolymers have a percent crystallinity within the range from 0.5 to 40%, and from 1 to 30% in another embodiment, and from 5 to 25% in yet another embodiment, wherein "percent crystallinity" is determined according to the DSC procedure described herein. (The thermal energy for the highest order of polypropylene is estimated at 189 J/g (i.e., 100% crystallinity is equal to 189 J/g)). In another embodiment, the propylene-α-olefin copolymer has a percent crystallinity from less than 40% or 25% or 22% or 20%.

In certain embodiments, the propylene-α-olefin copolymers have a single peak melting transition as determined by DSC; in certain embodiments the propylene-α-olefin copolymer has a primary peak melting transition from less than 90° C., with a broad end-of-melt transition from greater than about 110° C. The peak "melting point" ($T_m$) is defined as the temperature of the greatest heat absorption within the range of melting of the sample. However, the propylene-α-olefin copolymer may show secondary melting peaks adjacent to the principal peak, and/or the end-of-melt transition, but for purposes herein, such secondary melting peaks are considered together as a single melting point, with the highest of these peaks being considered the $T_m$ of the propylene-α-olefin copolymer. The propylene-α-olefin copolymers have a peak melting temperature ($T_m$) from less than 70 or 80 or 90 or 100 or 105° C. in certain embodiments; and within the range from 10 or 15 or 20 or 25 to 65 or 75 or 80 or 95 or 105° C. in other embodiments.

The procedure for DSC determinations is as follows. About 0.5 grams of polymer was weighed out and pressed to a thickness of about 15-20 mils (about 381-508 microns) at about 140° C.-150° C., using a "DSC mold" and Mylar™ as a backing sheet. The pressed pad was allowed to cool to ambient temperature by hanging in air (the Mylar was not removed). The pressed pad was annealed at room temperature (about 23-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin copolymers have a density within the range from 0.840 to 0.920 g/cm$^3$, and from 0.845 to 0.900 g/cm$^3$ in another embodiment, and from 0.850 to 0.890 g/cm$^3$ in yet another embodiment, the values measured at room temperature per the ASTM D-1505 test method.

In certain embodiments, the propylene-α-olefin copolymers have a Shore A hardness (ASTM D2240) within the range from 10 or 20 to 80 or 90 Shore A. In yet another embodiment, the propylene-α-olefin copolymers possess an Ultimate Elongation from greater than 500% or 1000% or 2000%; and within the range from 300 or 400 or 500% to 800 or 1200 or 1800 or 2000 or 3000% in other embodiments.

In certain embodiments, the propylene-α-olefin copolymers have a weight average molecular weight (Mw) value within the range from 20,000 to 5,000,000 g/mole, and from 50,000 to 1,000,000 g/mole in another embodiment, and from 70,000 to 400,000 g/mole in yet another embodiment. In another embodiment, the propylene-α-olefin copolymers have a number average molecular weight (Mn) value within the range from 4,500 to 2,500,000 g/mole, and from 20,000 to 250,000 g/mole in yet another embodiment, and from 50,000 to 200,000 g/mole in yet another embodiment. In yet another embodiment, the propylene-α-olefin copolymers have a z-average molecular weight (Mz) value within the range from 20,000 to 7,000,000 g/mole, and from 100,000 to 700,000 g/mole in another embodiment, and from 140,000 to 500,000 g/mole in yet another embodiment.

In certain embodiments, the propylene-α-olefin copolymers have a melt flow rate ("MFR," ASTM D1238, 2.16 kg, 230° C.), from less than 90 or 70 or 50 or 40 or 30 or 20 or 10 dg/min, and within the range from 0.1 or 0.5 or 1 or 5 or 10 to 20 or 30 or 40 or 50 or 70 or 90 dg/min in other embodiments. Thus, for example the MFR of the propylene-α-olefin copolymers is from 1 to 50 dg/min or from 1 to 30 dg/min.

In certain embodiments, a desirable molecular weight (and hence, a desirable MFR) is achieved by visbreaking the propylene-α-olefin copolymers. The "visbroken propylene-α-olefin copolymers" (also known in the art as "controlled rheology" or "CR") is a copolymer that has been treated with a visbreaking agent such that the agent breaks apart the polymer chains. Non-limiting examples of visbreaking agents include peroxides, hydroxylamine esters, and other oxidizing and free-radical generating agents. Stated another way, the visbroken copolymer may be the reaction product of a visbreaking agent and the copolymer. In particular, a visbroken propylene-α-olefin copolymer is one that has been treated with a visbreaking agent such that its MFR is increased, in one embodiment by at least 10%, and at least 20% in another embodiment relative to the MFR value prior to treatment.

In certain embodiments, the molecular weight distribution (MWD) of the propylene-α-olefin copolymers is within the range from 1.5 or 1.8 or 2.0 to 3.0 or 3.5 or 4.0 or 5.0 or 10.0 in particular embodiments. Techniques for determining the molecular weight (Mn, Mz and Mw) and molecular weight distribution (MWD) are as follows, and as by Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804 and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally accepted standards, for example, National Bureau of Standards, Polyethylene (SRM 1484) and anionically produced hydrogenated polyisoprenes (an alternating ethylene-propylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin copolymers described herein can be produced using any catalyst and/or process known for producing polypropylenes. In certain embodiments, the propylene-α-olefin copolymers can include copolymers prepared according to the procedures in WO 02/36651, U.S. Pat. No. 6,992,158, and/or WO 00/01745. Preferred methods for producing the propylene-α-olefin copolymers are found in US Patent Application Publication 2004/0236042 and U.S. Pat. No. 6,881,800. Preferred propylene-based polyolefin polymers are available commercially under the trade names Vistamaxx™ (ExxonMobil Chemical Company, Houston, Tex., USA) and Versify™ (The Dow Chemical Company, Midland, Mich., USA), certain grades of Tafmer™ XM or Notio™ (Mitsui Company, Japan) or certain grades of Softell™ (LyondellBasell Polyolefine GmbH, Germany). A commercial example of an ethylene-based polyolefin copolymer is Infuse™ olefin block copolymers (Dow Chemical).

Although the "polyolefin polymer" and/or "propylene-α-olefin copolymer" component of the fiber and fabric compositions is sometimes discussed as a single polymer, also contemplated by the term are blends of two or more different propylene-α-olefin copolymers having the properties described herein.

Process of Making Fibers, Fabrics and Constructions

The formation of elastic meltblown fabrics requires the manufacture of fibers by extrusion through a meltblowing apparatus that includes at least one die capable of handling the appropriate melt temperatures and pressures to spin fine denier fibers. The extrusion process for the low crystallinity polyolefin polymers is typically accompanied by aerodynamic drawing of the fibers. The elastic meltblown fabrics described herein may be manufactured by any technique known in the art capable of meltblowing polyolefin copolymers of a MFR from less than 90 dg/min. The elastic meltblown fabrics are meltblown from an apparatus that can operate at a melt pressure from greater than 500 psi (3.45 MPa) and a melt temperature within the range from 50 and 300° C. and capable of making fibers as fine as 5 µm in average diameter.

In certain embodiments, the process of making the elastic fibers and fabrics excludes any visbreaking agents from the meltblowing extruder and other parts of the apparatus. By "excludes" or "excluded," what is meant is that visbreaking agents such as peroxides, hydroxylamine esters, and other oxidizing and free-radical generating agents are not added to the extruder or any other component of the apparatus downstream of the extruder in the meltblowing apparatus. Thus, the copolymer being blown into a fiber and fabric is the copolymer having the desired MFR as introduced into the extruder feeding the meltblowing apparatus.

Examples of suitable meltblowing equipment for producing the elastic meltblown fabrics (and the elastic fibers that make up the fabrics) described herein are in U.S. Pat. No. 4,380,570, U.S. Pat. No. 5,476,616 and by R. Zhao, "Melt Blowing Polyoxymethylene Copolymer" in INT'L NONWOVENS J., 19-24 (Summer 2005). A desirable meltblowing apparatus will typically include at least one extruder, and may include a gear pump to maintain melt pressure within the apparatus. The extruder is coupled to at least one die block, or array die, such that the melt from the extruder can be transferred to the die block. There may be more than one array die. The array die includes a spinneret portion and is coupled also to at least one air manifold for delivering high pressure air to the spinneret portion of the die. The spinneret includes a plurality of spinning nozzles through which the melt is extruded and simultaneously attenuated with air pressure to form filaments, or fibers.

The meltblown fibers that form one or more layers of the multilayer constructions herein are formed by extruding the molten copolymer through a plurality of fine, usually circular, die capillaries or "spinning nozzles" as molten threads or filaments into converging, usually hot and high velocity, gas streams (e.g., air or nitrogen) to attenuate the filaments of molten thermoplastic material and form fibers. During the meltblowing process, the diameters of the molten filaments are reduced by the drawing air to a desired size. Thereafter, the meltblown fibers are carried by the high velocity gas stream and are deposited on a collecting surface to form at least one web of randomly disbursed meltblown fibers. The meltblown fibers may be continuous or discontinuous and are generally within the range from 5 to 250 μm in average diameter.

More particularly, in the meltblowing process useful for forming the elastic meltblown fabrics, molten polyolefin polymer is provided to at least one array die that is disposed between a pair of air plates, one being the top plate, that form one or more primary air nozzles. In one embodiment, the meltblowing apparatus includes an array die with a plurality of spinneret nozzles (or "nozzles"), the nozzle density within the range from 20 or 30 or 40 to 200 or 250 or 320 holes/inch. In one embodiment, each nozzle has an inside diameter within the range from 0.039, or 0.05, or 0.10, or 0.20, or 0.23, or 0.40, or 0.60, or 0.66, to 0.80 or 1.00 mm. The air plates in one embodiment are mounted in a recessed configuration such that the tips of the spinning nozzles are set back from the primary air nozzle. In another embodiment, air plates are mounted in a flush configuration where the air plate ends are in the same horizontal plane as the tip of the spinning nozzles. In yet other embodiments, the spinning nozzle tips are in a protruding or "stick-out" configuration so that the tip of the spinning nozzles extends past the ends of the air plates. Moreover, more than one air flow stream can be provided for use in the nozzles. A die or array die may be directly heated or indirectly heated. For example, dies or array dies may be directly heated via conventional electric methods or by hot air.

In one embodiment, hot air ("primary air") is provided through the primary air nozzle located at least on each side of the die tip. The hot air heats the die and thus prevents the die from becoming clogged with solidifying polymer as the molten polymer exits and cools. The hot air also draws, or attenuates, the melt into fibers. Secondary, or quenching, air at temperatures above ambient can also be provided through the die head. Primary air flow rates typically range from about 1 to about 50 or from about 10 to about 30 or from about 20 to 24 standard cubic feet per minute per inch of die width (SCFM/inch). In certain embodiments, the primary air pressure in the meltblown process typically ranges from 2 or 5 to 10 or 15 or 20 or 30 pounds per square inch gauge (psig) at a point in the die head just prior to exit. Primary air temperatures are typically within the range from 200 or 230 to 300 or 320 or 350° C. in certain embodiments.

The melt temperature of the polyolefin polymers used to make the elastic meltblown fabrics described herein is from greater than that to form a melt of the copolymer (and any other components) and below the decomposition temperature of the polyolefin polymers (and any other components), and in certain embodiments is within the range from 50 or 100 or 150° C. to 250 or 280 or 300° C. In yet other embodiments, the melt temperature is from less than 150 or 200 or 220 or 230 or 250 or 260 or 270 or 280° C. The polyolefin polymer is formed into fibers at a melt pressure from greater than 500 psi (3.45 MPa) or 750 psi (5.17 MPa) or 1000 psi (6.89 MPa), or within the range from 500 psi (3.45 MPa) or 750 psi (5.17 MPa) to 1000 psi (6.89 MPa) or 2000 psi (13.78 MPa) in other embodiments. Thus, the meltblowing apparatus must be able to generate and withstand such pressures to spin the propylene-α-olefin copolymer into the fabrics and multilayer constructions described herein.

Expressed in terms of the amount of composition flowing per hole of the die per unit of time, throughputs for the manufacture of elastic meltblown fabrics using the compositions described herein are typically within the range from 0.1 or 0.2 or 0.3 to 1.0 or 1.25 or 2.0 or 3.0 or more grams per hole per minute (ghm). Thus, for a die having 30 holes per inch, polymer throughput is typically greater than about 0.1 lbs/inch/hour (PIH), or greater than about 0.3 (PIH) or greater than about 1.0 (PIH) or from about 1 to about 12 (PIH), or from 2 to 5 (PIH), or from 7 or 8 (PIH).

Because such high temperatures can be used, a substantial amount of heat is desirably removed from the fibers in order to quench, or solidify, the fibers leaving the nozzles. Cold gases of air or nitrogen can be used to accelerate cooling and solidification of the meltblown fibers. In particular, cooling ("secondary") air flowing in a cross-flow direction (perpendicular or angled) relative to the direction of fiber elongation, may be used to quench meltblown fibers and produce smaller diameter fibers. Also, an additional, cooler pressurized quench air may be used and can result in even faster cooling and solidification of the fibers. In certain embodiments, the secondary cold air flow may be used to attenuate the fibers. Through the control of air and array die temperatures, air pressure, and polymer feed rate, the diameter of the fiber formed during the meltblown process may be regulated.

In certain embodiments, meltblown fibers produced herein have a diameter within the range from 5 or 6 or 8 or 10 to 20 or 50 or 80 or 100 or 150 or 200 or 250 μm in average diameter, and in other embodiments have a diameter from less than 80 or 50 or 40 or 30 or 20 or 10 or 5 μm.

After or during cooling, the elastic meltblown fibers are collected to form an elastic meltblown fabric. In particular, the fibers are collected on any desirable apparatus as is known in the art such as a moving mesh screen, moving belt or collecting (smooth or patterned/embossed) drum(s) or calander roll(s) located below or across from the nozzles. In order to provide enough space beneath the spinning nozzles for fiber forming, attenuation and cooling, forming distances from 4 inches to 2 feet between the polymer nozzle tips and the top of the mesh screen or collecting drum are required.

In certain embodiments, the elastic meltblown fabric is formed directly upon one or more extensible fabrics, such as but not limited to spunbond fabric(s), spunlace fabric(s), or combinations thereof. These fabrics may have a basis weight within the range of from 10 or 20 or 30 to 50 or 80 or 100 or 150 g/m$^2$. These fabrics may also be characterized by having an Ultimate Elongation in CD or MD from greater than 100% or 200% or 500% or 1000%. In this manner, multilayer constructions can be formed having structures such as MS, MX, SMS, MXM, XMX, XMMX, SMXS, SMMS, SSMXS, SSMMS, SSXS, SXS, SSMMXS, SMMMS, SSMMMS, XMSMX, wherein "X" represents a layer of spunlace fabric (where each "X" in a construction may be the same or different), "M" represents a layer of the present elastic meltblown fabric (where each "M" in a construction may be the same or different), and "S" represents a spunbond fabric (where each "S" in a construction may be the same or different). In certain embodiments, at least the "M" and one adjacent layer are adhered to one another, in other embodiments, at least the "M" and two adjacent layers are adhered. When such adhering of the elastic meltblown fibers to another fabric is desired, the secondary cooling air flow may be diminished and/or heated to maintain some of the melt quality and hence bonding ability of the forming elastic meltblown fibers to the fabrics upon which they are bonded.

In one or more embodiments, multilayer constructions include one or more layers of conventional meltblown fabric layers (C), e.g., SMCS, SMCMS, SCMCS, SSMCS, etc. At least one method of preparing such multilayer constructions is to retrofit conventional meltblown equipment with the equipment, i.e., die, etc., described herein to prepare such multilayer constructions.

More particularly, in forming a multilayered construction, the polyolefin polymers may be meltblown onto an extensible fabric, such as a spunlace fabric, that is passed underneath or in front of the forming elastic meltblown fabric. The melt temperature and distance between the spinnerets and the passing extensible fabric is adjusted such that the fibers are still in a melt or partial melt state when contacting the fabric(s) to form a two or three layer construction. The coated fabric(s) then has the melted or partially-melted elastic meltblown fibers/fabric adhered thereto.

In one embodiment of forming the multilayer construction, depicted in FIG. 1, the molten elastic meltblown fibers are applied symmetrically to two fabrics passing below or in front of the forming fibers, and in another embodiment, depicted in FIG. 2, the molten elastic meltblown fibers are applied to a first fabric, followed by contacting a second fabric to the polyolefin polymer-coated face of the first fabric. The orientation (angle with respect to the fabric passing under or in front of the forming fibers) and/or position (linear position along the axis of the fabric passing under or in front of the forming fibers) of the die with respect to the calendars can be adjusted to any degree between the two extremes of FIGS. 1 and 2.

In any case, the polyolefin polymer-coated fabric(s) may be passed through a nip between unheated or heated smooth rolls, unheated or heated patterned rolls, or a combination of two or more of these, while applying light pressure thereon, as another extensible construction is contacted with the polyolefin polymer coated fabric to form a three layer construction.

Given the formation of the multilayer constructions as described herein, in certain embodiments adhesives are substantially absent from the constructions, meaning that adhesives are not used to secure layers of fabric and/or film to one another in the constructions. For purposes of definition herein, an "adhesive" is a substance that is used to secure two layers of film or fabric to one another as is know in the art, the substance not being in the form of a fabric. Examples of adhesive substances include polyolefins, polyvinyl acetate polyamides, hydrocarbon resins, waxes, natural asphalts, styrenic rubbers, and blends thereof.

In any case, extensible fabrics useful in the multilayer constructions of the present invention may be characterized in certain embodiments by having an Elongation at Peak Load (ASTM D 1682) in either the machine direction (MD) or in the cross-machine direction (CD) or both from greater than 70% or 100% or 150%. The extensible fabric may be elastic or non-elastic. By "extensible non-elastic," it is meant that the layer can be relatively easily stretched beyond its elastic limit and permanently elongated by application of tensile stress. In contrast, an "elastic" layer, when subjected to a similar amount of elongation, deforms or stretches within its elastic limit, when the tensile stress is released, the layer will recover to nearly (greater than 80%) or completely (99-100%) its original length. The extensible fabrics useful in the multilayer constructions of the present invention can also be characterized in certain embodiments by having an Ultimate Elongation from greater than 200% or 300% or 500% or 1000%.

The extensible fabrics can be made from, for example, cellulose, nylons, polyolefin-terephthalates, polyesters, polyolefins, viscose, cotton, acrylic or combinations thereof. In certain embodiments, polyolefins are substantially absent from the extensible fabric (e.g., extensible spunlace fabric), and in another embodiment, the extensible fabric comprises at least 10 or 20 or 30 or 40 wt %, by weight of the extensible fabric, of a polyolefin.

In certain embodiments, the mechanical properties of the elastic meltblown fabrics (or multilayer constructions) described herein can be enhanced by a stretching or orientation process. Exemplary stretching/orientation equipment and techniques are disclosed in U.S. Pat. Nos. 4,368,565, 4,289,832, 4,285,100, 4,223,059, 4,153,751, 4,144,008, and 4,116,892, each of which is herein incorporated by reference in its entirety.

Annealing can be combined with mechanical orientation, in either or both the transverse (or "cross") direction (CD) or the machine direction (MD). If desired, mechanical orientation can be done by the temporary, forced extension of the polymer fiber for a short period of time before it is allowed to relax in the absence of the extensional forces. In the meltblowing process, there may be some degree of orientation of the fibers in the MD due to the spinning process alone. But in certain embodiments, no additional mechanical orientation or stretching is performed. Thus, in certain embodiments, the elastic meltblown fabrics described herein have a low degree of, or no, orientation. In other embodiments, orientation is imparted in the CD but not the MD. Thus, in certain embodiments the elastic meltblown fabric possesses an MD Elongation from less than 20% or less than 50% or less than 80% or less than 100% or less than 125% and a CD Elongation from greater than 100% or greater than 200% or greater than 300%. Stated another way, the elastic meltblown fabric possesses a CD/MD elongation at break ratio of between 0.1 or 0.5 and 2 or 3 or 5 or 7 or 10.

In one embodiment, the formation of the elastic fibers and fabrics includes an annealing step with or without mechanical orientation. Annealing may also be done after fabrication of the fabric from the elastic fibers. In certain embodiments, the elastic meltblown fiber or fabric is annealed at a temperature within the range from 50 or 60 to 130 or 160° C. Thermal annealing of the fabric is conducted by maintaining the fabric at a temperature within the range above for a period from 1 second to 1 minute, preferably between 1 and 10 seconds. The annealing time and temperature can be adjusted for any particular copolymer or copolymer composition. In another embodiment, the elastic meltblown fabrics described herein are annealed in a single-step by a heated roll (godet) during calendaring under low tension. In other embodiments, the elastic meltblown fabrics described herein require little to no post fabrication processing.

In certain embodiments, the forming multilayer construction is further processed by passing the multilayer construction through a hydroentangling apparatus, thus further bonding the web of elastic fibers to each other or other adjacent fabric layers by interlocking and entangling the fibers about each other with high velocity streams of water. Hydroentangling is known in the art and described in some detail by A. M. Seyam et al., "An Examination of the Hydroentangling Process Variables," in INT'L NONWOVENS J. 25-33 (Spring 2005).

In certain embodiments, other elastic materials such as polyurethanes, styrenic block copolymers and certain polyethylenes may make up part of all of one or more layers of the multilayer constructions described herein, in either a fabric form or film form. In other embodiments, styrenic block copolymers, as a fabric layer or component of a fabric layer, are substantially absent from the multilayer constructions described herein. In yet other embodiments, segmented polyurethane or polyurethanes are substantially absent from the multilayer constructions. In yet other embodiments, polyethylenes (polymers comprising greater than 50 wt % ethylene-derived units) are substantially absent from the multilayer constructions described herein. By "substantially absent," what is meant is that these materials are not added to any layer of the multilayer construction.

For example, a multilayer construction may include polyurethanes and/or styrenic block copolymers in an elastic layer or an inelastic layer or in both the elastic layer and the inelastic layer. A multilayer construction may include two or more layers of elastic fabrics that include polyurethanes and/or styrenic block copolymers. A multilayer construction may include at least one inelastic fabric layer that includes polyurethanes and/or styrenic block copolymers and at least one elastic fabric layer that include polyurethanes and/or styrenic block copolymers. Optionally such layers that include polyurethanes and/or styrenic block copolymers may include one or more additional polymers.

In any case, in certain embodiments of the multilayer constructions described herein, the number of continuous fibers per square inch (fiber density) of the elastic meltblown fabric is within the range from 20 or 40 or 50 to 100 or 500 fibers/in$^2$. Also, in certain embodiments the elastic meltblown fabric comprises fibers whose largest diameter fiber is 10 or 15 or 20 times the smallest diameter fiber.

In one or more embodiments, multilayer constructions having a basis weight of from 100 to 160 grams per square meter exhibit one or more of the following characteristics:

Permanent Set % (1st/2nd cycle) of less than 15%/10% or less than 20%/10% or less than 30%/10% or less than 40%/10% or less than 30%/20%;
Refractive Force @50% lbf/in of at least 0.1 or at least 0.15, or at least 0.2 or at least 0.3 or at least 0.4 or at least 0.5;
Peak Load lbs/in (1st cycle) of less than 0.5 or less than 1.0 or less than 2.0 or less than 3.0 or less than 3.5 or less than 3.75 or less than 4.0 or less than 4.25 or less than 4.5 or less than 4.75 or less than 5.0;
Peak Force MD (N) of at least 50 or at least 70 or at least 90 of at least 110 or at least 140 or at least 145 or at least 150 or at least 155 or at least 160 or at least 170 or at least 180 or at least 200;
Peak Force CD (N) of at least 60 or at least 65 or at least 70 or at least 75 or at least 80 or at least 85 or at least 90 or at least 100;
Elongation at Break MD (%) (ASTM D412) of at least 90 or at least 100 or at least 110 or at least 120 or at least 130 or at least 140;
Elongation at Break CD (%)(ASTM D412) of at least 250 or at least 275 or at least 300 or at least 325 or at least 350 or at least 375.

The multilayer constructions may be used to form, or used as part of, any number of articles, in particular, absorbent articles or hygiene articles. In certain embodiments, the articles comprising the multilayer constructions are baby diapers, pullups, training pants, hygiene closure systems, (e.g., elastic winds ears or tabs), adult incontinence briefs and diapers, panty liners, sanitary napkins, medical garments, and bandages.

Prior multilayer articles and methods are provided in EP 1 712 351 A, U.S. Pat. No. 4,380,570, U.S. Pat. No. 5,476,616, U.S. Pat. No. 5,804,286, U.S. Pat. No. 5,921,973, U.S. Pat. No. 6,342,565, U.S. Pat. No. 6,417,121, U.S. Pat. No. 6,444, 774, U.S. Pat. No. 6,506,698, US 2003/0125696, US 2005/0130544 A1, US 2006/0172647 and R. Zhao, "Melt Blowing Polyoxymethylene Copolymer" in INT'L NONWOVENS J., 19-24 (Summer 2005), which are each incorporated herein by reference in their entirety.

Having described the various features of the multilayer constructions and the methods of forming the multilayer constructions, disclosed herein in numbered embodiments is:

1. A multilayer construction comprising at least one layer of elastic meltblown fabric comprising one or more polyolefin polymer(s) having a MFR from less than 90 dg/min, the elastic meltblown fabric having an Ultimate Elongation from greater than 500%, and at least one extensible fabric layer.

2. A multilayer construction comprising at least one layer of elastic meltblown fabric comprising one or more polyolefin polymer(s) having a MFR from less than 90 dg/min, and $H_f$ value is from less than 75 J/g, and at least one extensible fabric layer.

3. A multilayer construction comprising at least one layer of elastic meltblown fabric comprising one or more polyolefin polymer(s) having a MFR from less than 90 dg/min, the elastic meltblown fabric having an Ultimate Elongation from greater than 500%, and at least one additional elastic layer.

4. A multilayer construction comprising at least one layer of elastic meltblown fabric comprising one or more polyolefin polymer(s) having a MFR from less than 90 dg/min, and $H_f$ value is from less than 75 J/g, and at least one additional elastic layer.

5. The multilayer construction of numbered embodiment 3 or 4, wherein the at least one additional elastic layer is a nonwoven fabric.

6. The multilayer construction of any of numbered embodiments 1-5, wherein the polyolefin polymer is a propylene-α-olefin copolymer(s) having a comonomer-derived content within the range from 5 to 35 wt % by weight of the copolymer.

7. The multilayer construction of any of the previous numbered embodiments in which the permanent set after 100% elongation is <15%.

8. The multilayer construction of any of the previous numbered embodiments in which the crystallinity can be either propylene based or ethylene based.

9. The multilayer construction of any of the previous numbered embodiments, wherein the propylene-α-olefin copolymer has an Ultimate Elongation from greater than 500%.

10. The multilayer construction of any of the previous numbered embodiments, wherein the construction has a peak force value (ASTM 2261-07a) within the range from 1 and 2 lbs at an Elongation of greater than 1000%.

11. The multilayer construction of any of the previous numbered embodiments, wherein the polyolefin polymer is blend with propylene homopolymer up to 30%.

12. The multilayer construction of any of the previous numbered embodiments, wherein the propylene-α-olefin copolymer possesses a molecular weight distribution within the range from 2.0 to 5.0.

13. The multilayer construction of any of the previous numbered embodiments, wherein the MFR of the propylene-α-olefin copolymer is within the range from 0.1 to 50 dg/min.

14. The multilayer construction of any of the previous numbered embodiments, wherein the elastic meltblown fabric comprises fibers having a diameter within the range from 5 to 200 μm.

15. The multilayer construction of any of the previous numbered embodiments, wherein the number of continuous fibers per square inch (fiber density) of the elastic meltblown fabric is within the range from 20 to 500 fibers/in$^2$.

16. The multilayer construction of any of the previous numbered embodiments, wherein the elastic meltblown fabric possesses an MD Elongation from less than 100% and a CD Elongation from greater than 100%.

17. The multilayer construction of any of the previous numbered embodiments, wherein the elastic meltblown fabric possesses a CD/MD elongation at break ratio of between 0.1 and 10.

18. The multilayer construction of any of the previous numbered embodiments, wherein the elastic meltblown fabric comprises fibers whose largest diameter fiber is greater than 5 times or greater than 10 times the smallest diameter fiber.

19. The multilayer construction of any of the previous numbered embodiments, wherein the extensible fabric can be manufactured by spunbond, meltblown, carded, airlaid or other means.

20. The multilayer construction of any of the previous numbered embodiments, wherein the extensible fabric comprises at least one layer of a spunlace fabric having a basis weight within the range of from 10 to 150 g/m$^2$ and comprising from greater than 10 or 30 wt %, by weight of the fabric, of a polyolefin.

21. The multilayer construction of any of the previous numbered embodiments, wherein the extensible fabric comprises cellulose, nylons, polyolefin-terephthalates, polyesters, polyolefins, viscose, cotton, acrylic or combinations thereof.

22. The multilayer construction of any of the previous numbered embodiments, wherein the extensible fabric has an Ultimate Elongation from greater than 200%.

23. The multilayer construction of any of the previous numbered embodiments, wherein the multilayer construction or its individual layers are not mechanically stretched or oriented.

24. The multilayer construction of any of the previous numbered embodiments, wherein styrenic block copolymers, as a fabric layer or component of a fabric layer, are substantially absent.

25. The multilayer construction of any of the previous numbered embodiments, wherein adhesives are substantially absent.

26. An absorbent article comprising the multilayer construction of any of the previous numbered embodiments.

27. The article of numbered embodiment 26, wherein the article is selected from baby diapers, pullups, training pants, adult incontinence briefs and diapers, panty liners, sanitary napkins, medical garments and bandages.

28. A process for forming a multilayer construction comprising extruding one or more polyolefin polymer(s) having a MFR from less than 90 dg/min through at least one die having a plurality of nozzles to form a plurality of continuous fibers, at least one die operating at a melt pressure from greater than 500 psi (3.45 MPa) to form at least one elastic meltblown fabric, and adhering the at least one elastic meltblown fabric to at least one extensible fabric.

29. A process for forming a multilayer construction comprising extruding one or more polyolefin polymer(s) having a MFR from less than 90 dg/min through at least one die having a plurality of nozzles to form a plurality of continuous fibers, at least one die operating at a melt pressure from greater than 500 psi (3.45 MPa) to form at least one elastic meltblown fabric, and adhering the at least one elastic meltblown fabric to at least one additional elastic layer.

30. A process for forming a multilayer construction of numbered embodiment 28 or 29, wherein the at least one additional elastic layer is a nonwoven fabric.

31. The process of numbered embodiment 28, wherein the elastic meltblown fabric is adhered to at least one face of a spunlace fabric having a basis weight within the range from 10 to 150 g/m$^2$.

32. The process of numbered embodiment 28, wherein the elastic meltblown fabric is adhered symmetrically to two or more spunlace fabrics having a basis weight within the range from 10 to 150 g/m$^2$, each spunlace fabric the same or different.

33. The process of numbered embodiment 28, wherein the elastic meltblown fabric is adhered asymmetrically to a face of each of two or more spunlace fabrics, each spunlace fabric having a basis weight within the range from 10 to 150 g/m$^2$, each spunlace fabric the same or different.

34. The process of numbered embodiments 28 and 31-33, wherein polyolefins are substantially absent from the spunlace fabric.

35. The process of numbered embodiments 28 and 31-34, wherein the extensible fabric comprises from greater than 10 wt %, by weight of the fabric, of a polyolefin.

36. The process of numbered embodiments 25-35, further comprising the step of passing the multilayer construction through a hydroentangling apparatus.

37. The process of numbered embodiments 25-36, wherein the die is operating at a melt temperature from less than 250° C., or less than 280° C., or less than 300° C., or less than 325° C. or less than 350° C.

38. The process of numbered embodiments 25-37, wherein the components are melt blended in an apparatus where visbreaking agents are excluded.

39. The process and multilayer construction of any of the previous numbered embodiments, wherein at least one elastic meltblown fabric is adhered to at least one extensible fabric layer.

40. The multilayer construction of any previous numbered embodiments 1-25, wherein the multilayer construction has a basis weight of greater than 25 gms or greater than 50 gms or greater than 100 gms, or from 50 to 110 gms or from 75 to 110 gms or from 110 gms to 250 gms or from 110 to 200 gms or from 110 to 160 gms.

41. The multilayer construction of any previous claim, wherein the construction has a peak force value (ASTM 2261-07a) within the range from 0.3 and 5 lbs at an Elongation of greater than 300%.

42. The multilayer construction of any previous numbered embodiments 1-25, 40, or 41, wherein the multilayer construct is mechanically activated.

43. An article comprising the multilayer construction of any of numbered embodiments 40-42.

44. The article of numbered embodiment 42 wherein the article is a hygiene article, hygiene article closure system, baby diaper, pullup, training pant, adult incontinence brief, adult incontinence diaper, panty liner, sanitary napkin, medical garment, or bandage.

EXAMPLES

Example 1

A meltblown fabric and multilayer construction is formed in the following manner, using equipment and conditions similar to that of R. Zhao, "Melt Blowing Polyoxymethylene Copolymer" in INT'L NONWOVENS J., 19-24 (Summer 2005). In particular, a Biax-Fiberfilm™ meltblown line (Biax-Fiberfilm Corp., Greenville, Wis.) operating at a melt pressure within the range from 1200 psi (6.89 MPa) to 1700 psi (10.34 MPa) and a melt temperature within the range from 200 to 275° C. and using an array die with a spinneret hole density of between 50 and 150 holes/inch is used to form the meltblown fibers, fabric, and multilayer construction. The line includes an extruder, a die-block and spinneret, as well as an air manifold for the spinneret supplying air pressures within the range from 5 to 20 psi (34 kPa to 138 kPa) and air temperatures within the range from 220 to 260° C. Vistamaxx™ 6202 specialty elastomer (a polyolefin polymer possessing an MFR of 18 dg/min, and comonomer, $C_2$, content of 15 wt %, ExxonMobil Chemical Co.) is meltblown under these conditions using the Biax-Fiberfilm line to form the fibers, fabric and multilayer construction. The Vistamaxx is melt blended in the extruder, and is meltblown via the Biax-Fiberfilm array die, onto an extensible construction of spunlace fabric (50/50 PP/PET, 30 g/m², Jacob-Holm Industries, Inc.) that is passed underneath or in front of the forming fibers of meltblown Vistamaxx. The fiber average diameter is within the range of from 15 to 45 µm. The melt temperature and distance between the spinnerets and the passing spunlace fabric is adjusted such that the fibers are still in a melt or partial melt state when contacting the spunlace fabric(s) to form a two or three layer construction.

The coated spunlace fabric(s) having the melted or partially-melted Vistamaxx adhered thereto by i) the inherent tendency of the polyolefin materials ability to bond and ii) the ability of the meltblowing fibers to entangle with the fibers comprising the spunlace fabric to generate a mechanical linkage. The Vistamaxx coated spunlace fabric(s) is then optionally passed through a nip between unheated smooth rolls, unheated patterned rolls and optionally patterned rolls, while applying light pressure thereon, as another extensible fabric is contacted with the Vistamaxx coated spunlace fabric to form a three layer construction. The elastic meltblown fabric thus formed has an Ultimate Elongation of greater than 500%.

In one example, the molten Vistamaxx fibers are applied symmetrically to two spunlace fabrics passing below or in front of the forming fibers thus forming a construction. In another example the molten Vistamaxx fibers are applied asymmetrically to two spunlace fabrics to form a multilayer construction; that is, applied such that unequal amounts of the forming Vistamaxx fibers are applied to each fabric. In yet another example, the molten Vistamaxx fibers are applied to a first spunlace fabric, followed by contacting a second spunlace construction to the Vistamaxx-coated face of the first spunlace fabric, therein forming a construction.

The average diameter of the elastic meltblown fibers is adjusted by adjusting the primary and secondary air (pressure, temperature, direction) as is known, as well as other operational parameters, so that the fabric has an Ultimate Elongation of greater than 500% as well as the desired softness and other desirable properties.

Example 2

Eight multilayer constructions were prepared and the physical properties were tested. Each multilayer construction was prepared with a meltblown layer composed of Vistamaxx specialty elastomer as a nonwoven elastic engine, i.e., middle layer, interleaved between conventional spunlace outer layers. The eight multilayer constructions were prepared as described in Table 1.

TABLE 1

| Sample ID | Basis Wt gsm | Incrementally Stretched |
|---|---|---|
| 1.2 | 135 | Yes/No |
| 1.3 | 160 | Yes/No |
| 1.09 | 110 | No |
| 5.57 | 110 | Yes |
| 1.10 | 135 | No |
| 5.28 | 135 | Yes |
| 1.11 | 160 | No |
| 5.58 | 160 | Yes |

Unless stated otherwise, the following cyclic testing procedure was used to gather data and prepare hysteresis curves as shown in the Figures. Generally, a sample of nonwoven fabric is stretched one or more times using an Instron 1130 instrument, which is commercially available from Instron Corporation. Unless stated otherwise, the test parameters used herein to generate hysteresis curves are: sample width=1 inch, sample length=3 inches, gauge length, i.e., distance between clamps, is 1 inch, crosshead speed, i.e., speed of top clamp that is applying a stretching force, is 10 in/min. As used herein "first cycle" and "second cycle" refer to the number of times an individual sample has been stretched.

Samples were tested by first cutting a nonwoven fabric sample to the specified sample size. Each test sample was loaded in to an Instron 1130 instrument by first attaching the sample to the crosshead/top clamp and then to the bottom clamp. The distance between the clamps being the specified gauge length. No pre tension was applied on the sample.

The sample was then stretched to the desired strain, e.g., 100%, or 200%, as measured by sample length, using a crosshead speed, i.e., stretch speed, of 10 in/min. The sample was then returned to zero load at the same crosshead speed without any hold time. The force on the sample as a function of strain during extension and retraction was recorded.

The sample was removed from the instrument for further characterization or stretched one or more times if additional cycles data was desired, e.g., second cycle data. Second cycle hysteresis curves were prepared by remounting samples already tested in a first cycle. Samples were mounted using the same gauge length unless specifically reported otherwise. The same procedure described above for the first cycle was utilized for the second cycle.

Unless described otherwise herein, permanent set is the amount of strain remaining in a sample after retraction from a specificed strain expressed as a percentage of the specificed strain. The elongation remaining in the sample at zero load after retraction (as determined by the intercept of the retraction curve with the x-axis) is divided by the maximum elongation the sample was stretched during that cycle.

Unless described otherwise herein, refractive force at 50% is the force exerted by a sample after stretching to a given elongation and allowing the sample to retract to one-half of that elongation.

Unless described otherwise herein, peak load (lbs/in) is the maximum load in pounds force exerted on the sample during extension divided by the width of the sample in inches.

Unless described otherwise herein, peak force MD (N) is the maxium force exerted on a sample during extension in the machine direction (MD) expressed in Newtons.

Unless described otherwise herein, peak force CD (N) is the maximum force exerted on a sample during extension in the cross direction (CD) expressed in Newtons.

Unless described otherwise herein, elongation at break MD (%) is the increase in length of a sample measured at the breaking point after extension in the machine direction divided by the original gauge length expressed as a percentage.

Unless described otherwise herein, elongation at break CD (%) is the increase in length of a sample measured at its breaking point after stretching in the cross direction divided by the original gage length expressed as a percentage.

Figure 3B:
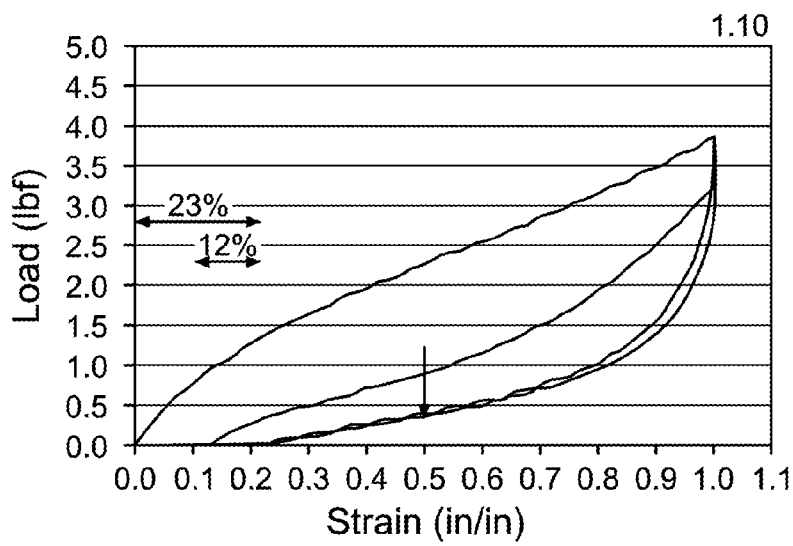
Figure 3C:
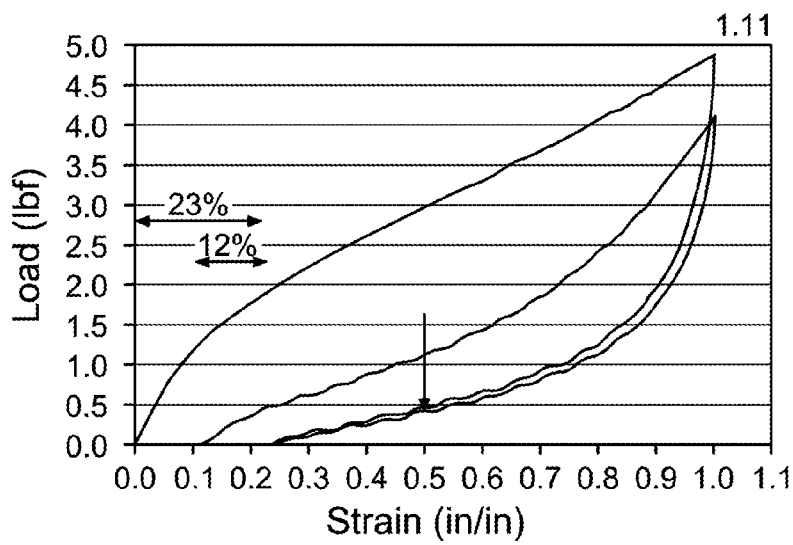
Figure 8A:
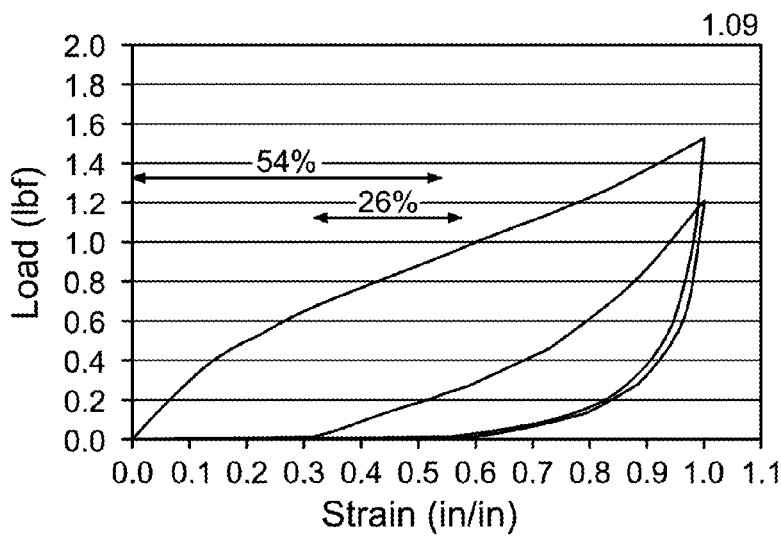
FIGS. 8A, 8B, and 8C are load (lb) vs strain (in/in) plots of retractive force performance of exemplary multilayer constructs.
Figure 8B:
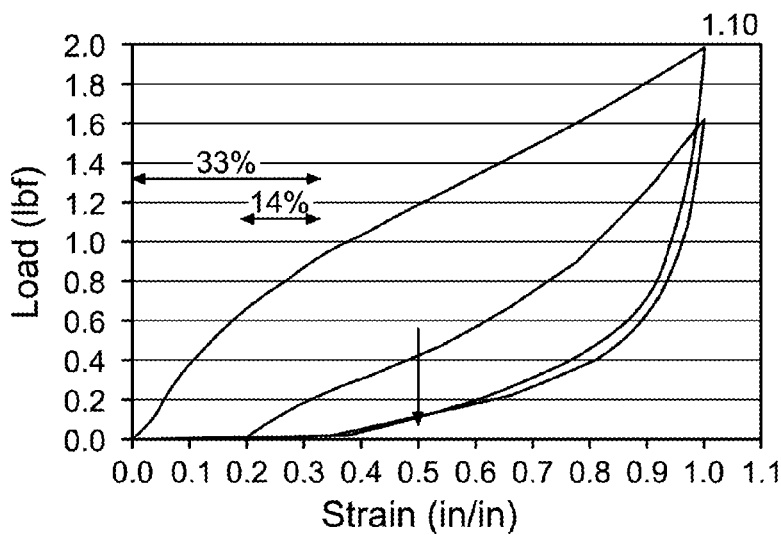
Figure 8C:
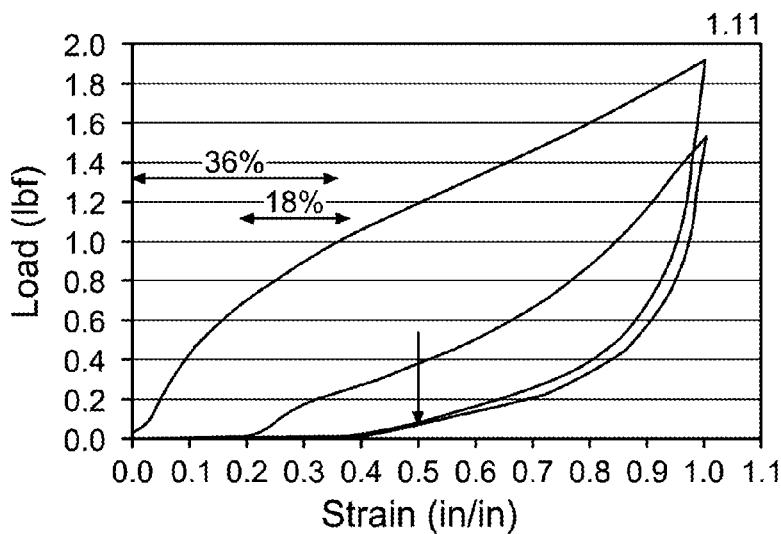

As shown in FIGS. 3A, 3B, and 3C and Table 2, hysteresis was tested at room temperature. As shown in FIGS. 8A, 8B, and 8C and Table 3, hysteresis was tested at 100° F. Test conditions for both temperatures: sample width=2", gauge=3", crosshead speed=20 in/min, 100% stretch.

TABLE 2

| Sample ID | Perm Set % - $1^{st}/2^{nd}$ Cycle | Retractive Force @ 50% - lbf/gf | Peak Load lbs - $1^{st}/2^{nd}$ cycle |
|---|---|---|---|
| 1.09 | 33/19 | 0.15/68 | 4.16/3.35 |
| 1.10 | 23/11 | 0.38/168 | 3.87/3.23 |
| 1.11 | 23/12 | 0.44/200 | 4.68/4.06 |

TABLE 3

| Sample ID | Perm Set % - $1^{st}/2^{nd}$ Cycle | Retractive Force @ 50% - lbf/gf | Peak Load lbs - $1^{st}/2^{nd}$ cycle |
|---|---|---|---|
| 1.09 | 54/26 | 0/0 | 1.54/1.21 |
| 1.10 | 33/14 | 0.11/50 | 1.97/1.62 |
| 1.11 | 36/18 | 0.08/36 | 1.93/1.55 |

Figure 4C:
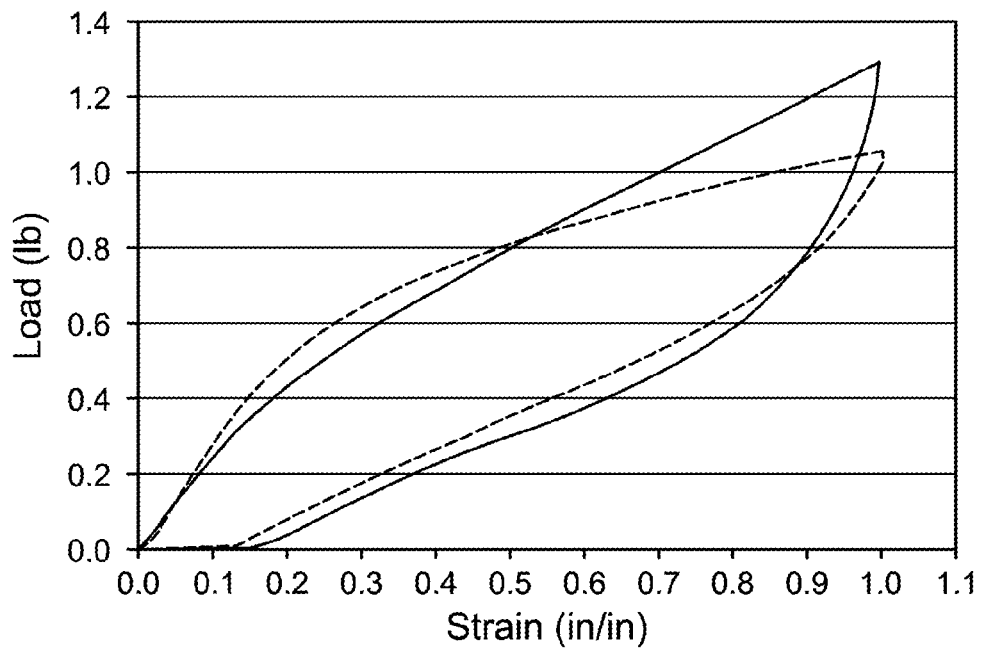

As shown in FIGS. 4A, 4B, and 4C, performance is compared between inventive multilayer constructs and conventional laminate constructs used in commercial diaper ears.

Figure 5:
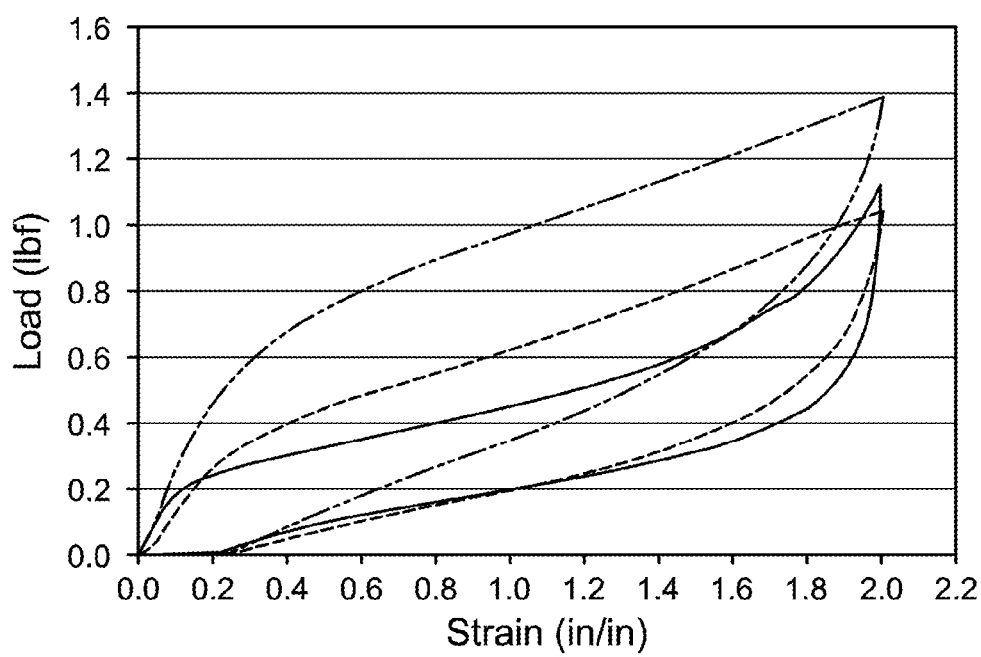

As shown in FIG. 5, performance is compared between inventive multilayer constructs and conventional adult incontinence (AI) chassis used in commercial products.

Figure 6A:
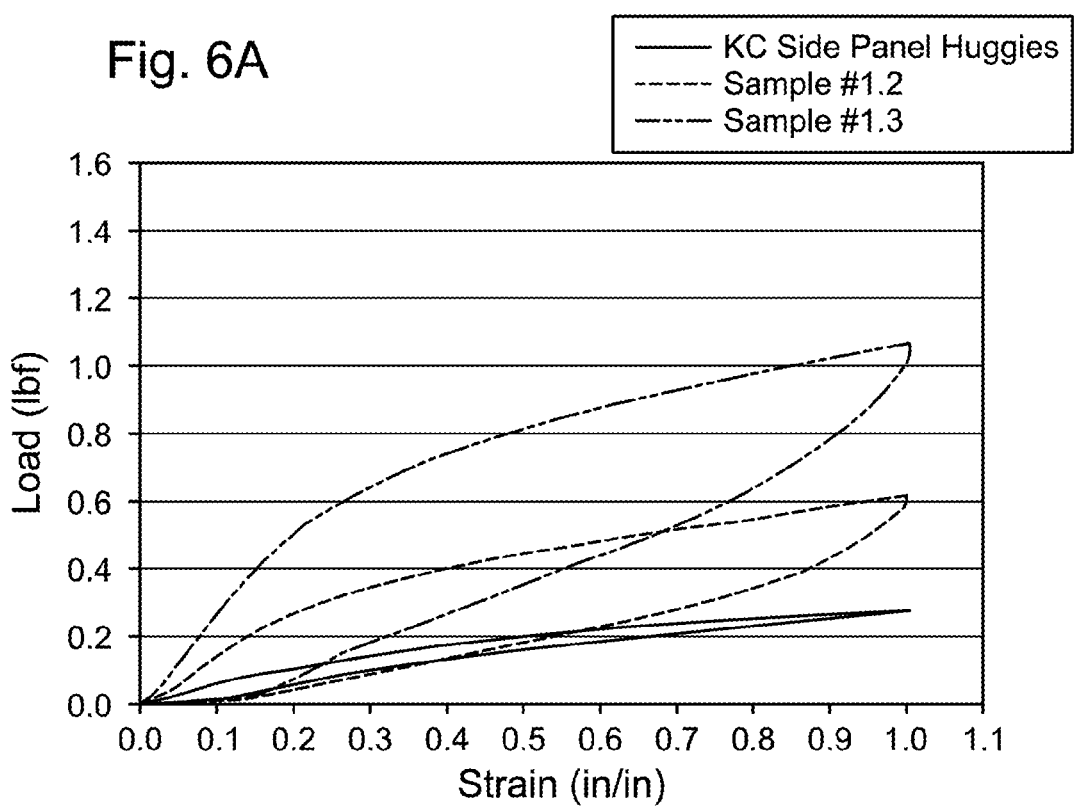
FIGS. 6A and 6B are load (lb) vs strain (in/in) plots of performance of exemplary multilayer constructs and a conventional pull up side panel.
Figure 6B:
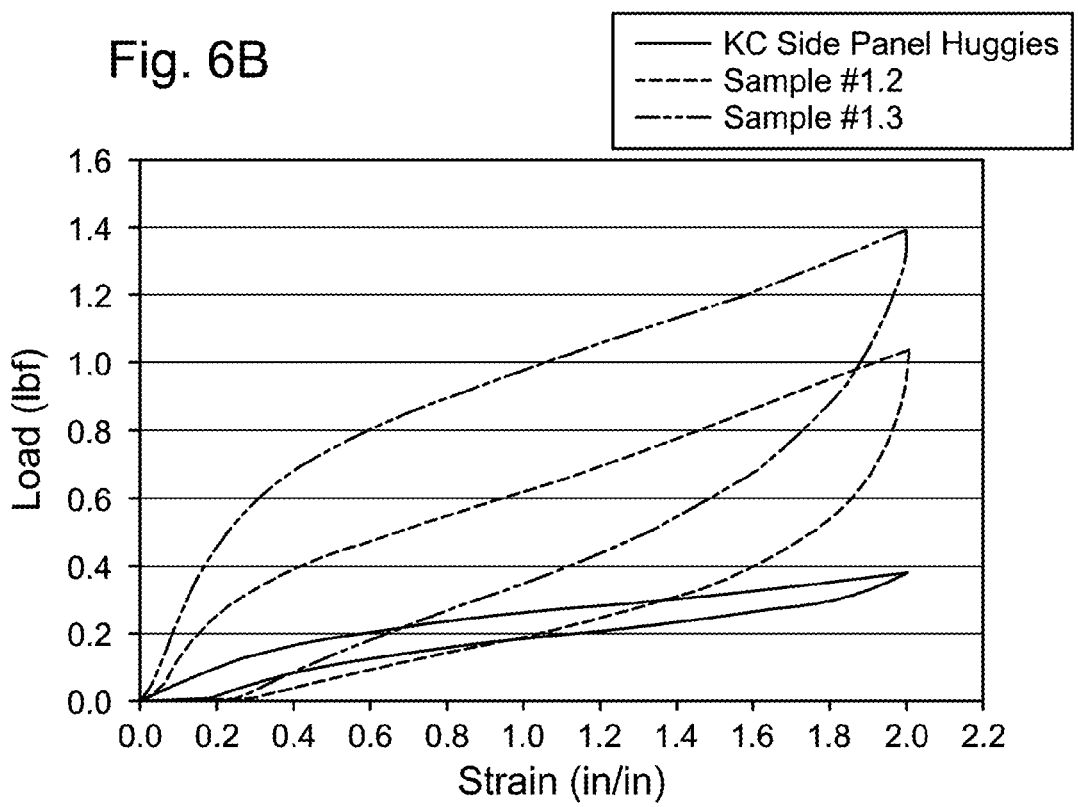

As shown in FIGS. 6A and 6B, performance is compared between inventive multilayer constructs and conventional pull-up side panels. Test conditions: room temperature, sample width 1", 1" gauge, crosshead speed of 10 in/min.

Six multilayer constructs were tested for grab tensile performance. Test conditions: room temperature, width of 3", grip of 1", gauge 6", crosshead speed 20 in/min, reported as an average of 3 samples. Performance is reported in Table 4.

TABLE 4

| Sample ID | Peak Force - MD (N)/(lbf) | Elongn to Break - MD (%) | Peak Force - CD (N)/(lbf) | Elongn to Break - CD (%) |
|---|---|---|---|---|
| 1.09 | 149.1/33.4 | 91.5 ± 7.0 | 74.1/16.6 | 278 ± 12 |
| 5.57 | 141.3/31.7 | 109 | 69.4/15.6 | 282 |
| 1.10 | 153.5/34.4 | 121 ± 19 | 74.6/16.7 | 310 ± 14 |
| 5.28 | 134.4/30.1 | 117 | 75.3/16.9 | 313 |
| 1.11 | 170.3/38.2 | 106 ± 16 | 84.5/18.9 | 286 ± 23 |
| 5.58 | 141.3/31.7 | 101 | 74.5/16.7 | 276 |

Table 5 shows the results of a qualitative evaluation between inventive multilayer constructs and conventional hygiene products. The evaluation scale is from one to five. One is the best rating. Five is the worst rating.

TABLE 5

| | Basis Weight | QUALITATIVE EVALUATION | | | | | | |
| | | Cloth-Like Aesthetics | | Comfort | | Elastic Performance | | Overall | Unweighted |
| Sample ID# | (gms) | Handfeel | Appearance | Cool Light | Breathability | Stretchability | Recovery | Impression | Average |
|---|---|---|---|---|---|---|---|---|---|
| 1.2* | 135 | 1 | 2 | 2 | 1 | 2 | 3 | 2 | 1.9 |
| 1.3* | 160 | 2 | 2 | 3 | 2 | 3 | 3 | 2.5 | 2.5 |
| 1.2 | 135 | 2 | 2 | 4 | 3 | 3 | 4 | 2.5 | 2.9 |
| 1.3 | 160 | 2 | 2 | 5 | 4 | 4 | 4 | 3 | 3.4 |
| Competitive Product Comparisons | | | | | | | | | |
| Training Pant Stretch Side Panels | | | | | | | | | |
| Pampers Easy Ups | | 2 | 4 | 2 | 1 | 1 | 1 | 2 | 1.9 |
| Huggies Pull Ups | | 4 | 4 | 3 | 3 | 1 | 1 | 3 | 2.7 |
| Diaper Stretch Wings | | | | | | | | | |
| Pampers Cruisers | | 2 | 4 | 2 | 1 | 1 | 1 | 3 | 1.9 |
| Huggies Natural Fit | | 3 | 4 | 3 | 3 | 2 | 1 | 3 | 2.7 |
| Toys R Us | | 1 | 2 | 3 | 2 | 3 | 3 | 2 | 2.3 |
| Wal-Mart's White Cloud | | 3 | 4 | 5 | 4 | 3 | 3 | 4 | 3.7 |

TABLE 5-continued

| | Basis Weight | Cloth-Like Aesthetics | | Comfort | | Elastic Performance | | Overall | Unweighted |
|---|---|---|---|---|---|---|---|---|---|
| Sample ID# | (gms) | Handfeel | Appearance | Cool Light | Breathability | Stretchability | Recovery | Impression | Average |
| Adak Protective Underwear Outer Pant | | | | | | | | | |
| SCA Tena Serenity Underwear | | 2 | 2 | 2 | 1 | 1 | 1 | 2 | 1.6 |
| Premium Assurance Underwear | | 3 | 3 | 3 | 3 | 2 | 2 | 3 | 2.7 |
| Prevall Ultra Thin Underwear | | 3 | 4 | 4 | 4 | 2 | 2 | 3 | 3.1 |
| Wal-Mart Assurance Underwear | | 5 | 5 | 4 | 4 | 2 | 2 | 5 | 3.9 |

*In-line Stretching
Pampers is a Registered Trademark of The Procter & Gamble Co.
Huggies is a Registered Trademark of Kimberly-Clark Worldwide Inc.
White Cloud is a Registered Trademark of Wal-Mart
Tena is a Registered Trade mark of SCA Personal Care.
Assurance is a Registered Trademark of Covidien.
Prevall is a Registered Trademark of First Quality Products.

Figure 7:
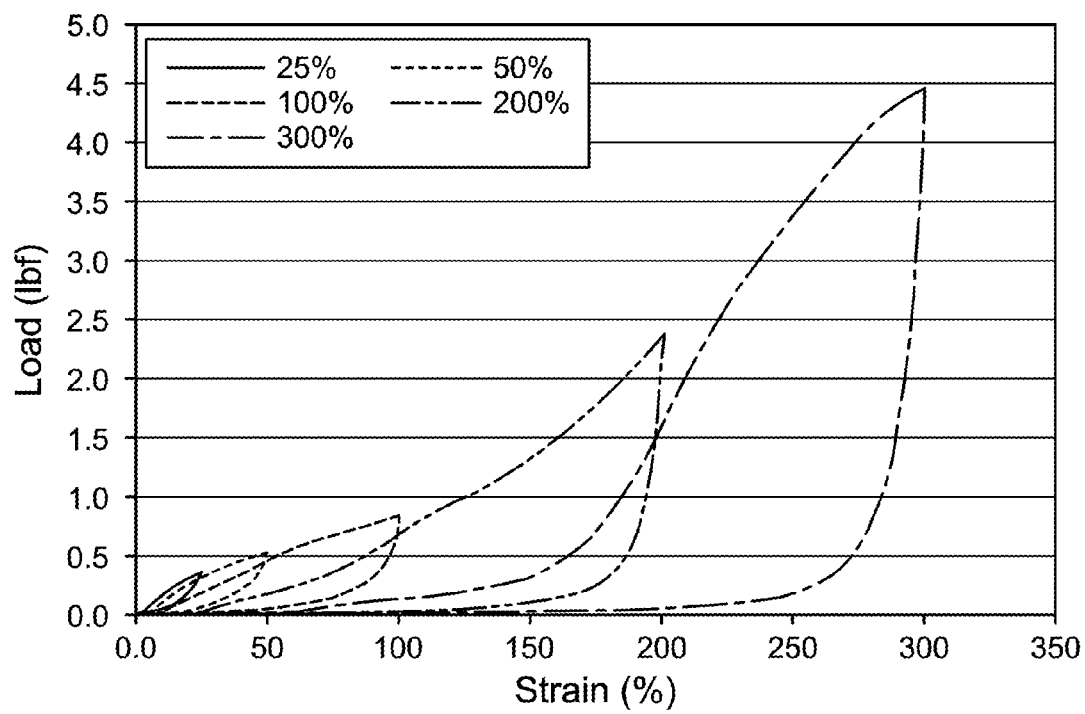

As shown in FIG. 7 and Table 6, tension set performance at 100° F. was tested for six inventive multilayer constructs. Test conditions: sample width of 1", gauge of 3", crosshead speed 20 in/min, data is reported as an average of three samples, conditioned for five minutes.

TABLE 6

| | 25% | | 50% | | 100% | | 200% | | 300% | |
|---|---|---|---|---|---|---|---|---|---|---|
| Sample ID | PS (%) | Load (lbf) | PS (%) | Load (lbf) | PS (%) | Load (lbf) | PS (%) | Load (lbf) | PS (%) | Load (lbf) |
| 1.09 | 7.7 | 0.23 | 15.9 | 0.36 | 41 | 0.64 | 105 | 2.32 | 127 | 4.40 |
| 5.57 | 7.8 | 0.19 | 16.7 | 0.33 | 42 | 0.70 | 95 | 3.21 | — | — |
| 1.10 | 4.7 | 0.35 | 10.1 | 0.49 | 24 | 0.80 | 66 | 2.35 | 81 | 4.45 |
| 5.28 | 6.3 | 0.23 | 14.5 | 0.39 | 39 | 0.72 | 100 | 2.79 | — | — |
| 1.11 | 5.8 | 0.50 | 11.3 | 0.72 | 31 | 1.12 | 72 | 2.92 | — | — |
| 5.58 | 7.8 | 0.33 | 15.2 | 0.51 | 37 | 0.95 | 90 | 3.08 | — | — |

Figure 9A:
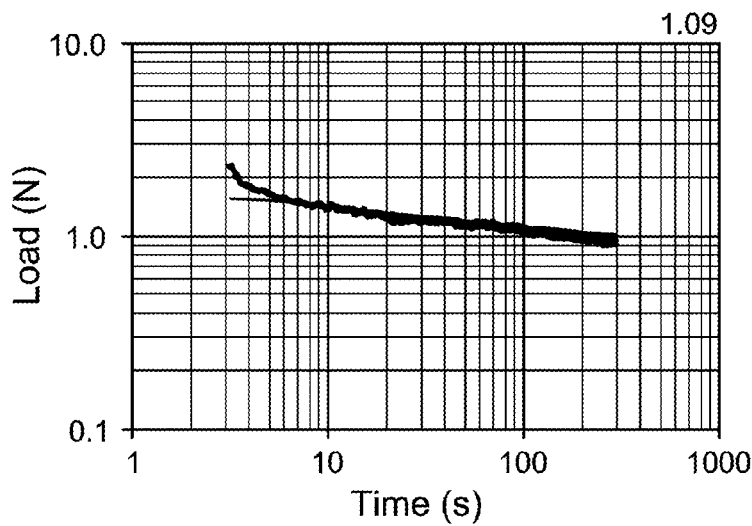
FIGS. 9A, 9B, and 9C are load (N) vs time (seconds) plots of stress relaxation performance at 100° F. of exemplary multilayer constructs.
Figure 9B:
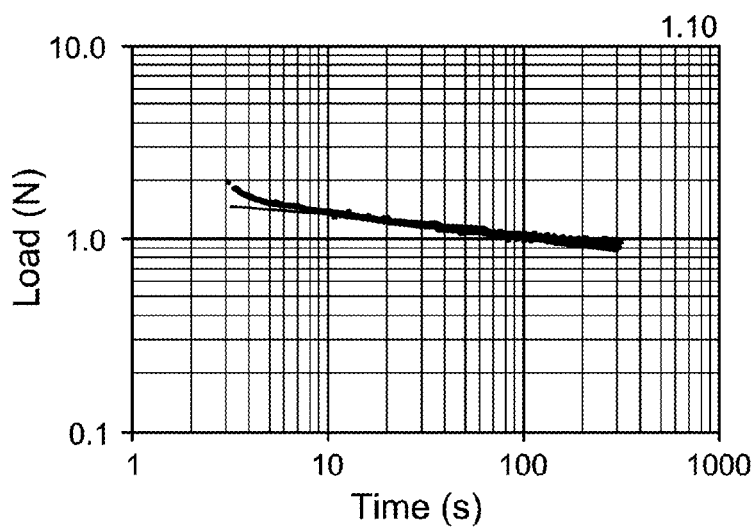
Figure 9C:
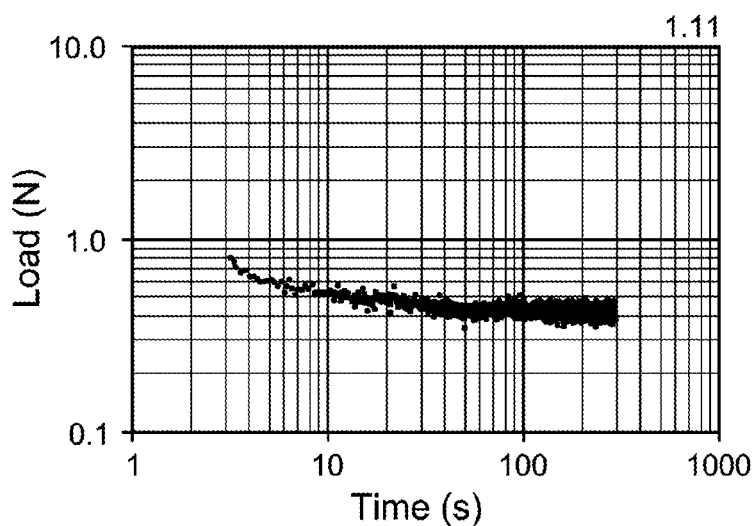

As shown in FIGS. 9A, 9B, and 9C and Table 7, stress relaxation performance was measured at 100° F. Test conditions: sample width of 1", gauge of 1", crosshead speed 10 in/min, and a peak strain of 50%.

TABLE 7

| Sample ID | Load Loss [(Li − Lf)/Lf] * 100 @ 60 s | Load Loss [(Li − Lf)/Lf] * 100 @ 120 s | Load Loss [(Li − Lf)/Lf] * 100 @ 240 s |
|---|---|---|---|
| 1.09 | 50.5 | 54.6 | 58.9 |
| 1.10 | 45.0 | 48.8 | 52.1 |
| 1.11 | 46.6 | 44.5 | 47.1 |

What is claimed is:

1. A process for forming a multilayer construction comprising:
  (a) forming a first spunbond layer;
  (b) meltblowing to form at least one elastic meltblown layer comprising
    (i) a propylene-α-olefin copolymer having a comonomer-derived content within the range from 5 to 35 wt % by weight of the copolymer, a peak melting temperature within the range from 10 to 105° C., and a MFR of less than 20 dg/min, wherein the elastic meltblown fabric has an Ultimate Elongation from greater than 300%, or
    (ii) a propylene-α-olefin copolymer having a comonomer-derived content within the range from 5 to 35 wt % by weight of the copolymer, a peak melting temperature within the range from 10 to 105° C., and a MFR of less than 20 dg/min and $H_f$ value from less than 75 J/g;
  wherein the propylene-α-olefin copolymer is meltblown at a melt pressure of from about 750 psi to about 2000 psi to form the elastic meltblown layer;
  (c) forming a second spunbond layer; and
  (d) adhering the elastic meltblown layer to the first and second spunbond layers, wherein the elastic meltblown layer is between the first and second spunbond layers; wherein the elastic meltblown layer is formed by meltblowing the one or more polyolefin polymer(s) directly upon at least one of the first or second spunbond layers; and wherein at least one of the first or second spunbond layers comprises spunlace.

2. The process of claim 1, wherein the propylene-α-olefin copolymer possesses a molecular weight distribution within the range from 2.0 to 5.0.

3. The process of claim 1, wherein the MFR of the propylene-α-olefin copolymer is within the range from 1 to 10 dg/min.

4. The process of claim 1, wherein the elastic meltblown layer comprises fibers having a diameter within the range from 5 to 200 μm.

5. The process of claim 1, wherein the number of continuous fibers per square inch (fiber density) of the elastic meltblown layer is within the range from 20 to 500 fibers/in$^2$.

6. The process of claim 1, wherein the elastic meltblown layer possesses an MD Elongation from less than 100% and a CD Elongation from greater than 100%.

7. The process of claim 1, further comprising stretching or orienting the multilayer construction.

8. The process of claim 1, wherein adhesives are substantially absent.

9. The process of claim 1, wherein the elastic meltblown layer further comprises at least one of sodium benzoate, talc, oleamide, erucamide, carbon black, clay, talc, calcium carbonate, mica, silica, and silicate.

10. The process of claim 1, wherein the spunbond layer comprising spunlace has a basis weight of from 10 to 150 g/m2.

11. The process of claim 1, wherein the spunlace comprises polypropylene and polyolefin-terephthalate.

12. The process of claim 1, wherein the propylene-α-olefin copolymer is meltblown at a melt temperature of from 200 to 275° C. to form the elastic meltblown layer.

13. The process of claim 1, wherein the propylene-α-olefin copolymer is meltblown at a melt pressure of from 1200 psi to 1700 psi and a melt temperature of from 200 to 275° C. to form the elastic meltblown layer.

* * * * *